(12) United States Patent
Signaoff et al.

(10) Patent No.: US 8,605,730 B2
(45) Date of Patent: Dec. 10, 2013

(54) SYSTEM AND METHOD FOR MULTIMEDIA COMMUNICATION ACROSS DISPARATE NETWORKS

(75) Inventors: Christopher S. Signaoff, Hutto, TX (US); Tom W. Opsahl, Flower Mound, TX (US); Edward M. Riley, III, Flower Mound, TX (US); Justin S. Signaoff, Round Rock, TX (US)

(73) Assignee: DirectPacket Research, Inc., Irving, TX (US)

( * ) Notice: Subject to any disclaimer, the term of this patent is extended or adjusted under 35 U.S.C. 154(b) by 511 days.

(21) Appl. No.: 12/661,316

(22) Filed: Mar. 15, 2010

(65) Prior Publication Data

US 2010/0177786 A1    Jul. 15, 2010

Related U.S. Application Data

(63) Continuation-in-part of application No. 11/403,549, filed on Apr. 13, 2006, now Pat. No. 7,710,978, and a continuation-in-part of application No. 12/505,268, filed on Jul. 17, 2009.

(51) Int. Cl.
  *H04L 12/28* (2006.01)
  *H04L 12/66* (2006.01)
  *H04L 29/06* (2006.01)
  *H04J 3/16* (2006.01)
  *H04K 1/00* (2006.01)
  *G06F 15/16* (2006.01)

(52) U.S. Cl.
  USPC ............ 370/395.5; 37/401; 37/466; 380/255; 709/230; 713/151; 726/3

(58) Field of Classification Search
  USPC ........ 370/395.5, 401, 466; 380/255; 709/230; 713/151; 726/3
  See application file for complete search history.

(56) References Cited

U.S. PATENT DOCUMENTS

| | | | |
|---|---|---|---|
| 6,047,320 A | 4/2000 | Tezuka et al. | |
| 6,266,809 B1 | 7/2001 | Craig et al. | |
| 6,380,968 B1 | 4/2002 | Alexander et al. | |
| 6,434,140 B1 | 8/2002 | Barany et al. | |
| 6,611,503 B1 | 8/2003 | Fitzgerald et al. | |
| 6,614,465 B2 | 9/2003 | Alexander et al. | |
| 6,633,324 B2 | 10/2003 | Stephens, Jr. | |
| 6,633,985 B2 | 10/2003 | Drell | |
| 6,711,166 B1 * | 3/2004 | Amir et al. | 370/395.1 |
| 6,735,626 B1 | 5/2004 | Tezuka et al. | |
| 6,751,562 B1 * | 6/2004 | Blackett et al. | 702/61 |
| 6,795,444 B1 | 9/2004 | Vo et al. | |
| 6,798,782 B1 | 9/2004 | Caronni et al. | |
| 6,963,583 B1 | 11/2005 | Foti et al. | |
| 6,975,647 B2 * | 12/2005 | Neale et al. | 370/466 |
| 7,016,935 B2 | 3/2006 | Lee et al. | |
| 7,020,130 B2 | 3/2006 | Krause et al. | |
| 7,023,465 B2 | 4/2006 | Stephens, Jr. | |
| 7,031,341 B2 | 4/2006 | Yu | |
| 7,039,701 B2 | 5/2006 | Wesley | |

(Continued)

*Primary Examiner* — Alpus H Hsu
(74) *Attorney, Agent, or Firm* — Fulbright & Jaworski LLP

(57) ABSTRACT

A method of communication between endpoint devices that includes converting data packets from a multiport protocol to a proprietary port protocol so that the data packets can traverse firewalls protecting the endpoint devices. A system that includes networks protected by firewall wherein the communication between the networks is in a proprietary protocol and the system further including a device for managing the communication between the protected networks.

31 Claims, 15 Drawing Sheets

(56) References Cited

U.S. PATENT DOCUMENTS

| | | | | |
|---|---|---|---|---|
| 7,050,422 | B2* | 5/2006 | Xu et al. | 370/352 |
| 7,127,518 | B2* | 10/2006 | Vange et al. | 709/230 |
| 7,159,036 | B2 | 1/2007 | Hinchliffe et al. | |
| 7,177,929 | B2 | 2/2007 | Burbeck et al. | |
| 7,181,530 | B1 | 2/2007 | Halasz et al. | |
| 7,194,526 | B2 | 3/2007 | Kanemitsu | |
| 7,206,808 | B2 | 4/2007 | Babka et al. | |
| 7,228,488 | B1* | 6/2007 | Grass et al. | 714/776 |
| 7,237,260 | B2* | 6/2007 | Yu et al. | 726/11 |
| 7,251,689 | B2 | 7/2007 | Wesley | |
| 7,254,643 | B1* | 8/2007 | Peters et al. | 709/246 |
| 7,266,683 | B1* | 9/2007 | Nag | 713/154 |
| 7,293,169 | B1 | 11/2007 | Righi et al. | |
| 7,313,133 | B2* | 12/2007 | Yarlagadda | 370/352 |
| 7,313,134 | B2* | 12/2007 | Yarlagadda | 370/352 |
| 7,328,406 | B2 | 2/2008 | Kalinoski et al. | |
| 7,346,076 | B1 | 3/2008 | Habiby et al. | |
| 7,346,912 | B2 | 3/2008 | Seebaldt | |
| 7,353,380 | B2 | 4/2008 | VanHeyningen | |
| 7,363,381 | B2 | 4/2008 | Mussman et al. | |
| 7,370,097 | B2 | 5/2008 | Hashimoto | |
| 7,372,957 | B2 | 5/2008 | Strathmeyer et al. | |
| 7,385,622 | B2 | 6/2008 | Babka et al. | |
| 7,436,428 | B2 | 10/2008 | Schrader et al. | |
| 7,441,270 | B1 | 10/2008 | Edwards et al. | |
| 7,460,488 | B2* | 12/2008 | Mayernick | 370/254 |
| 7,649,898 | B1* | 1/2010 | May et al. | 370/401 |
| 7,751,316 | B2* | 7/2010 | Yarlagadda et al. | 370/230 |
| 7,774,468 | B1* | 8/2010 | Nag et al. | 709/226 |
| 7,788,354 | B2* | 8/2010 | Nag | 709/223 |
| 7,966,418 | B2* | 6/2011 | Shedrinsky | 709/237 |
| 7,983,254 | B2* | 7/2011 | Alt et al. | 370/389 |
| 2001/0046234 | A1 | 11/2001 | Agrawal et al. | |
| 2002/0186683 | A1* | 12/2002 | Buck et al. | 370/352 |
| 2003/0065737 | A1 | 4/2003 | Aasman | |
| 2003/0081783 | A1 | 5/2003 | Adusumilli et al. | |
| 2003/0135616 | A1* | 7/2003 | Carrico et al. | 709/225 |
| 2003/0182451 | A1 | 9/2003 | Grass et al. | |
| 2003/0188001 | A1* | 10/2003 | Eisenberg et al. | 709/229 |
| 2003/0227908 | A1 | 12/2003 | Scoggins et al. | |
| 2003/0232648 | A1 | 12/2003 | Prindle | |
| 2004/0037268 | A1 | 2/2004 | Read | |
| 2004/0158606 | A1 | 8/2004 | Tsai | |
| 2005/0021610 | A1 | 1/2005 | Bozionek et al. | |
| 2005/0021772 | A1 | 1/2005 | Shedrinsky | |
| 2005/0080919 | A1 | 4/2005 | Li et al. | |
| 2005/0122964 | A1 | 6/2005 | Strathmeyer et al. | |
| 2005/0125696 | A1 | 6/2005 | Afshar et al. | |
| 2005/0141482 | A1 | 6/2005 | Kleiner | |
| 2005/0243747 | A1 | 11/2005 | Rudolph | |
| 2005/0259145 | A1 | 11/2005 | Schrader et al. | |
| 2005/0271051 | A1 | 12/2005 | Holloway et al. | |
| 2006/0098684 | A1 | 5/2006 | Bozionek et al. | |
| 2006/0104288 | A1 | 5/2006 | Yim et al. | |
| 2006/0109862 | A1 | 5/2006 | Choi et al. | |
| 2006/0168321 | A1* | 7/2006 | Eisenberg et al. | 709/238 |
| 2006/0187903 | A1 | 8/2006 | Kallio et al. | |
| 2006/0190719 | A1 | 8/2006 | Rao et al. | |
| 2006/0224883 | A1 | 10/2006 | Khosravi et al. | |
| 2007/0005804 | A1 | 1/2007 | Rideout | |
| 2007/0022201 | A1 | 1/2007 | Aaby et al. | |
| 2007/0036143 | A1 | 2/2007 | Alt et al. | |
| 2007/0074274 | A1* | 3/2007 | Nowicki | 726/4 |
| 2007/0239841 | A1 | 10/2007 | Lehrman | |
| 2007/0242696 | A1 | 10/2007 | Signaoff et al. | |
| 2008/0043091 | A1 | 2/2008 | Lia et al. | |
| 2008/0134200 | A1 | 6/2008 | Seebaldt | |
| 2008/0235362 | A1 | 9/2008 | Kjesbu et al. | |
| 2009/0051752 | A1 | 2/2009 | Lammers | |
| 2009/0112671 | A1 | 4/2009 | Grodum | |

* cited by examiner

SYSTEM AND METHOD FOR MULTIMEDIA COMMUNICATION ACROSS DISPARATE NETWORKS

CROSS-REFERENCE TO RELATED APPLICATIONS

This application is a continuation-in-part application, claiming the benefit of U.S. patent application Ser. No. 11/403,549, filed Apr. 13, 2006, entitled "SYSTEM AND METHOD FOR TRAVERSING A FIREWALL WITH MULTIMEDIA COMMUNICATION," and U.S. patent application Ser. No. 12/505,268, filed Jul. 17, 2009, entitled "SYSTEMS AND METHODS FOR MANAGEMENT OF NODES ACROSS DISPARATE NETWORKS," the disclosures of which are hereby incorporated herein by reference.

TECHNICAL FIELD

The present invention relates, in general, to electronic communications, and more specifically, to transmitting communication data within a multimedia communication system.

BACKGROUND

The Internet may be used for many forms of communication, including voice conversations, video conferencing, development collaboration, and the like. In order for a manufacturer's programs, applications, equipment, and systems to be interoperable with each other, many protocols have been developed to standardize the communication between such systems. These protocols have grown increasingly complex to handle all the types of traffic generated to facilitate communication for video conferencing, voice over Internet Protocol (VoIP), and data over Internet Protocol applications. Two such prominent protocols are H.323 from the International Telecommunication Union—Telecommunication Standardization Sector (ITU-T) and the Session Initiation Protocol (SIP) from the Internet Engineering Task Force (IETF). Both H.323 and SIP typically allow for multimedia communication including voice, video, and data communications in real-time. In addition to H.323 and SIP, there are various other types of communication protocols, such as HTTP, HTTPS, FTP, TFTP, SSH, TELNET and SNMP. These different protocols may be utilized by a management system for managing endpoint communication devices. For instance, HTTP may be used for communicating scheduling information and FTP may be used for communicating software updates to endpoint devices, and SNMP may be used for pinging an endpoint device to determine whether it is operational (or to otherwise query an endpoint device for information).

In Internet Protocol (IP) communication networks, devices or endpoints on the network are identified by their respective IP address. Applications and programs on the different devices further identify each other using port numbers. A port number is a sixteen bit integer, the value of which falls into one of three ranges: the well-known ports, ranging from 0 through 1023; the registered ports, ranging from 1024 through 49151; and the dynamic and/or private ports, ranging from 49152 through 65535. The well-known ports are reserved for assignment by the Internet Corporation for Assigned Names and Numbers (ICANN) for use by applications that communicate using the Transmission Control Protocol (TCP) or User Datagram Protocol (UDP) and generally can only be used by a system/root process or by a program run by a privileged user. The registered ports may be registered for use by companies or other individuals for use by applications that communicate using TCP or UDP. The dynamic or private ports, by definition, cannot be officially registered nor are they assigned. Both the H.323 and SIP standards use multiple, well-known, registered, and/or dynamic ports in order to facilitate such communication.

H.323 and SIP each rely on multiple other protocols, some of which may in turn rely on UDP for sending and receiving multimedia traffic. UDP features minimal overhead compared to other transport protocols (most notably TCP) at the expense of having less reliability. UDP does not provide for guaranteed packet delivery nor data integrity. UDP does offer the highest possible throughput, thus, making it ideally suited for multimedia real-time communications.

Multimedia communications traffic will most likely have to traverse a firewall at some point during transmission, especially over the Internet, regardless to which protocol the traffic conforms. Firewalls are used in modern networks to screen out unwanted or malicious traffic. Disparate networks, such as different local area networks (LANs), are typically protected by a firewall that restricts certain externally-originated communication from entering the protected network. That is, the firewall of a given LAN may block certain traffic to minimize the risk of allowing malicious traffic into the LAN. Accordingly, multimedia communications traffic will most likely have to traverse a firewall at some point during transmission, especially over the Internet, regardless to which protocol the traffic conforms. Firewalls are used in modern networks to screen out unwanted or malicious traffic. It should be understood that, as used herein, a "firewall" may refer to any piece of equipment or device that is configured to restrict certain externally-originated communication from entering the protected network. As one example, a firewall may be implemented via an access control list and/or rules deployed on a router or other device. Of course, a firewall may be achieved through implementation of any access control device that restricts certain traffic from entering and/or exiting the protected network.

One of many techniques a firewall may use is packet filtering, wherein the firewall determines whether or not to allow individual packets by analyzing information in the packet header (such as the IP address and port of the source and destination). Thus, various ports or IP addresses may be blocked to minimize the risk of allowing malicious traffic into an important computer network or system. Another more advanced technique is called stateful inspection, where in addition to analyzing header information, a firewall keeps track of the status of any connection opened by network devices behind the firewall. Deciding whether or not a packet is dropped in a stateful inspection is based on the tracked status of the connection and information from within the packet header. In practice, firewalls (especially those used by large corporations) generally only allow traffic from the well-known ports, though such firewalls may be specially configured to allow traffic on any port. For multimedia communication systems that use multiple registered and dynamic ports, firewalls (unless specially configured) will generally block the data traffic on these ports between multimedia systems, thus preventing communication.

Video conferencing endpoints generally use multiple dynamic ports for the transmission of communication data packets and, as such, each port used necessitates opening that port on a firewall. Additionally, different endpoints participating in different conversations use different sets of ports, further increasing the number of ports to be opened on a firewall. Reconfiguring ports on a firewall is a time consuming task that introduces the risk of human error, which may defeat the purpose of the firewall by leaving a network vulnerable to malicious attacks. Furthermore, even though these dynamic ports should be closed after the communication ends, in practice, once a firewall port is open, it remains open because the firewall technicians typically do not expend the additional time resources to close the ports.

Additionally, many video conferencing systems do not support encryption. In such cases, the communication between endpoints is not secure and may be intercepted while being transmitted across the Internet.

Existing video conferencing systems such as TANDBERG's BORDER CONTROLLER™, a component of TANDBERG's EXPRESSWAY™ firewall traversal solution, requires the use of TANDBERG Gatekeepers or TANDBERG traversal enabled endpoints. While allowing firewall traversal, the EXPRESSWAY™ solution still requires user intervention to select and trust a range of ports on a firewall and requires the purchase of TANDBERG equipment to use existing legacy video conference endpoints that are not traversal-enabled. The V2IU™ series of products from Polycom, Inc., are Application Level Gateways (ALG) that act as protocol-aware firewalls that automate the selection and trusting of ports, but as such, multiple ports are still used when sending traffic between endpoints with the risk of having such traffic being blocked by a non-protocol-aware firewall. Further, such an ALG does not provide for secure communication. The PATHFINDER™ series of products from RadVision, Ltd., provides for firewall traversal via multiplexing to a single port, but still requires opening a port on a firewall. Multiplexing is implemented by taking sections of data from each of the data streams coming through the various ports and placing them alternately into a single stream. Thus, the resulting stream is simply a train of interleaved data bits that are not recognized as any particular communication protocol. At the destination end point, a packet constructor picks each data bit and places it in the appropriate stream on the appropriate port and rebuilds the original stream.

Similar systems have been implemented for voice, VoIP, and data over IP communication systems. Each either relies on a proprietary system or equipment or relies on actually selecting and opening multiple ports in a firewall that could leave the underlying network vulnerable to malicious electronic attacks.

BRIEF SUMMARY

The present invention is directed generally to a system and method for transporting multiport protocol traffic between endpoint communication devices, which may reside on disparate protected networks (i.e., networks that are protected by respective firewalls). In certain embodiments, the multiport protocol traffic is communicated using a single-port protocol that is known to be transmitted on a port that is typically open on standard firewalls. Multiport protocol traffic from a first endpoint is converted into a single-port protocol for transport between the protected networks. The traffic is then reconverted to the multiport protocol and directed to the appropriate ports at a targeted second endpoint.

In certain embodiments, the multiport protocol traffic is converted to (e.g., encapsulated within) a proprietary protocol that is used for transmitting the traffic from one protected network (on which a first endpoint communication device resides) to another protected network (on which a second endpoint communication device resides). As discussed further herein, the proprietary protocol is referred to as a proprietary protocol because it is a protocol that is not natively supported by (i.e., understood by) the endpoint communication devices. The proprietary protocol is supported by (i.e., understood by) one or more nodes (e.g., front-end and/or back-end devices, as discussed further herein) that are employed for transporting the traffic between the endpoint communication nodes residing on disparate protected networks. In one embodiment of the invention, a communication community is established (e.g., by two or more endpoint communication devices residing on disparate protected networks registering with a front-end device), wherein communication among the endpoint communication devices flows between the protected networks using the proprietary protocol.

A "back-end" device, as used herein, generally refers to a device that supports the proprietary protocol and which resides behind a firewall protecting a protected endpoint communication device, whereas a "front-end" device, as used herein, generally refers to a device that supports the proprietary protocol and which resides outside of the protected network (i.e., is not behind the firewall). Thus, for instance, in certain embodiments, a back-end device may reside on one or more disparate protected networks to which one or more endpoint communication devices are also coupled; and one or more front-end devices may reside external to the protected networks, where the front-end device(s) may aid in transporting communication between two or more disparate protected networks.

In certain embodiments, the proprietary protocol is a single-port protocol. Thus, in certain embodiments, the proprietary protocol may traverse one or more firewalls, as discussed further herein. For instance, in certain embodiments, a back-end device residing on a first protected network may encapsulate communication in a multiport protocol from a first endpoint communication device into the proprietary protocol, which is used for transporting the communication from the first protected network to at least a second protected network on which a second endpoint communication device resides. A back-end device residing on the second protected network may receive the communication in the proprietary protocol, decapsulate the communication to result in the multiport protocol, and transmit the resulting multiport protocol communication to the second endpoint communication device.

Of course, as discussed further herein, in certain embodiments one or more of the endpoint communication devices may themselves effectively act as the above-mentioned back-end device. For instance, one or more of the endpoint communication devices may have software loaded thereon (e.g., which may be downloaded from a server or otherwise installed on the endpoint communication devices), which executes to encapsulate multiport protocol communication that is natively output by the endpoint communication device into the proprietary protocol for transmission from the endpoint communication device and which likewise executes to decapsulate received communication that is in the proprietary protocol into the multiport protocol communication that is natively supported by the endpoint communication device.

Likewise, as discussed further herein, in certain embodiments one or more of the protected networks may not include a back-end device (e.g., either implemented as a separate back-end device or implemented on an endpoint communication device), and yet one or more endpoint communication devices may still participate in communication with other endpoint communication devices, which may or may not reside on protected networks on which such a back-end device is implemented. For instance, in certain embodiments a tunneling protocol may be employed for tunneling the multiport protocol communication to/from the endpoint communication device(s) residing on a protected network that does not include a back-end device. The tunneling protocol may be a single-port communication protocol or other known tunneling protocol for traversing firewalls. A device that is external to the protected network on which the endpoint communication device resides may convert between the tunneling protocol and the proprietary protocol, and the proprietary protocol may be used for transmitting the communication at least part of the way between the two or more disparate protected networks on which the endpoint communication devices reside.

Using either the proprietary protocol, which may be single-port protocol, or a tunneling protocol, the traffic may traverse one or more firewalls (e.g., by using a well-known and/or commonly-open port), such that little or no reconfiguration of the firewall is required. In so doing, the administrative burden of requiring network administrators to manually reconfigure the firewalls for each of the disparate protected networks to permit multi-port communication between endpoint communication devices during a desired communication session is avoided. In addition, the risk of human error leaving a network vulnerable to malicious attacks is reduced. Moreover, instead of creating an unrecognizable data stream, which may still be rejected by more-advanced firewalls, such as through multiplexing, various embodiments of the present invention actually employs a single-port communication protocol that is recognized and generally accepted by the firewall.

In one embodiment, a method is provided for communicating between two or more endpoint communication devices (e.g., personal computers, videophones, etc.). According to the method, data in a first multiport protocol is output from a first endpoint communication device that resides within a first protected network. The first multiport protocol may be a protocol that is natively supported by the first endpoint communication device. The data is converted to a proprietary protocol that is not natively supported by the first endpoint communication device. For instance, in certain embodiments, the data in the first multiport protocol is encapsulated in the proprietary protocol. In certain embodiments, the proprietary protocol is a single-port communication protocol. The data in the proprietary protocol is then reconverted to a multiport communication protocol for receipt by a second endpoint communication device, which resides in a second protected network.

In certain embodiments, the converting to the proprietary protocol is performed by a device within the first protected network. For instance, the converting may be performed by a back-end device that is communicatively coupled to the first protected network. In certain embodiments, the first endpoint communication device itself comprises logic (e.g., software executing thereon) for performing the converting, whereby the output data may be converted to the proprietary protocol by the first endpoint communication device before being transmitted from such first endpoint communication device.

Similarly, in certain embodiments, the reconverting from the proprietary protocol to a multiport protocol is performed by a device within the second protected network. For instance, the reconverting may be performed by a back-end device that is communicatively coupled to the second protected network. In certain embodiments, the second endpoint communication device itself comprises logic (e.g., software executing thereon) for performing the reconverting.

In certain embodiments, the converting to the proprietary protocol is performed, at least partly, by (or under the control of) a device residing outside of the first protected network (e.g., a front-end device). Similarly, in certain embodiments, the reconverting from the proprietary protocol to a multiport protocol is performed, at least partly, by (or under the control of) a device residing outside of the second protected network (e.g., a front-end device).

For instance, in certain embodiments, the converting to the proprietary protocol may comprise converting from the multiport protocol to a tunneling protocol, and thereafter converting from the tunneling protocol to the proprietary protocol. As an example, in certain embodiments, the converting comprises converting the data from the multiport protocol to a tunneling protocol, which is used for traversing one or more firewalls (such as the firewall protecting the first protected network). The tunneling protocol may then be converted (e.g., by a front-end device) to the proprietary protocol, which is then used for transporting the data at least part of the way to the second protected network.

Similarly, in certain embodiments, the reconverting comprises reconverting (e.g., by a front-end device) from the proprietary protocol to a tunneling protocol, which is then used for traversing the firewall protecting the second protected network. A back-end device residing on the second protected network (e.g., the second endpoint communication device itself) receives the data in the tunneling protocol and reconverts from the tunneling protocol to the multiport communication protocol that is natively supported by the second endpoint communication device.

According to another embodiment, a method is provided for communicating between two or more endpoint communication devices. According to the method, data is output from a first endpoint communication device residing in a first protected network in a first multiport protocol. The data is converted from the first multiport protocol to a tunneling protocol. The data in the tunneling protocol traverses at least one firewall (e.g., the firewall protecting the first protected network), and then the data in the tunneling protocol is converted to a proprietary protocol that is not natively supported by the first endpoint communication device.

The data is then reconverted from the proprietary protocol a second multiport protocol that is supported by a second endpoint communication device that resides on a second protected network. The second multiport protocol may be the same multiport protocol as the first multiport protocol that is supported by the first endpoint communication device. In certain instances (e.g., when the second protected network comprises a suitable back-end device), the reconverting is performed by a back-end device that resides within the second protected network (e.g., the second endpoint communication device itself or some other back-end device). In other instances (e.g., when the second protected network does not comprise a suitable back-end device), the reconverting from the proprietary protocol to a multiport protocol is performed at least partly by (or under the control of) a device residing outside of the second protected network (e.g., a front-end device). For instance, in certain embodiments, the reconverting comprises reconverting (e.g., by a front-end device) from the proprietary protocol to a tunneling protocol, which is then used for traversing the firewall protecting the second protected network. A back-end device residing on the second protected network (e.g., the second endpoint communication device itself) receives the data in the tunneling protocol and reconverts from the tunneling protocol to the multiport communication protocol that is natively supported by the second endpoint communication device.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

A variety of protocols require the use of multiport traffic. Whether the traffic is data between applications, voice communications, or video conferencing, whenever multiport traffic is used there is a possibility of some or all of the traffic being blocked by a firewall between two devices that are attempting to communicate. As an example, video conferencing systems, whether they are based on H.323, SIP, or other similar multimedia communication protocols, use multiple ports and multiple protocols in order to enable two-way audio and video communication. The communication protocols specify different types of traffic that may be sent between endpoints which include media traffic (voice, video, and the like) along with the control traffic (camera, connection control, and the like). The media traffic is comprised of data for the images and sound being transmitted between endpoints with the control traffic comprising data used to control the connection between endpoints and the features of the endpoint (e.g., camera direction, zoom, and the like). Due to its higher throughput rate, UDP may typically be utilized for the real-time communication traffic between endpoints. TCP may be utilized for traffic requiring data integrity (e.g., control traffic). As such, video conferencing systems typically make use of both TCP and UDP to transport the multimedia data to enable communication. The ports that are typically used to enable the two-way communication include various ports across the well-known ports, the registered ports, and the dynamic ports. Firewalls are usually set up to block unrequested traffic and/or traffic coming in on dynamic ports. Furthermore, UDP does not provide a mechanism for identifying received traffic as requested traffic. Thus, programs and endpoints that send traffic conforming to UDP are at risk of having that traffic blocked by the remote endpoint's firewall for both being unrequested and being sent on a blocked port. As used herein, a "firewall" refers to any piece of equipment or device that is configured to restrict certain externally-originated communication from entering the protected network (e.g., a LAN, etc.). As one example, a firewall may be implemented via an access control list and/or rules deployed on a router or other device. Of course, a firewall may be achieved through implementation of any access control device that restricts certain traffic from entering and/or exiting the protected network. Many implementations of firewalls are known in the art.

Figure 1:
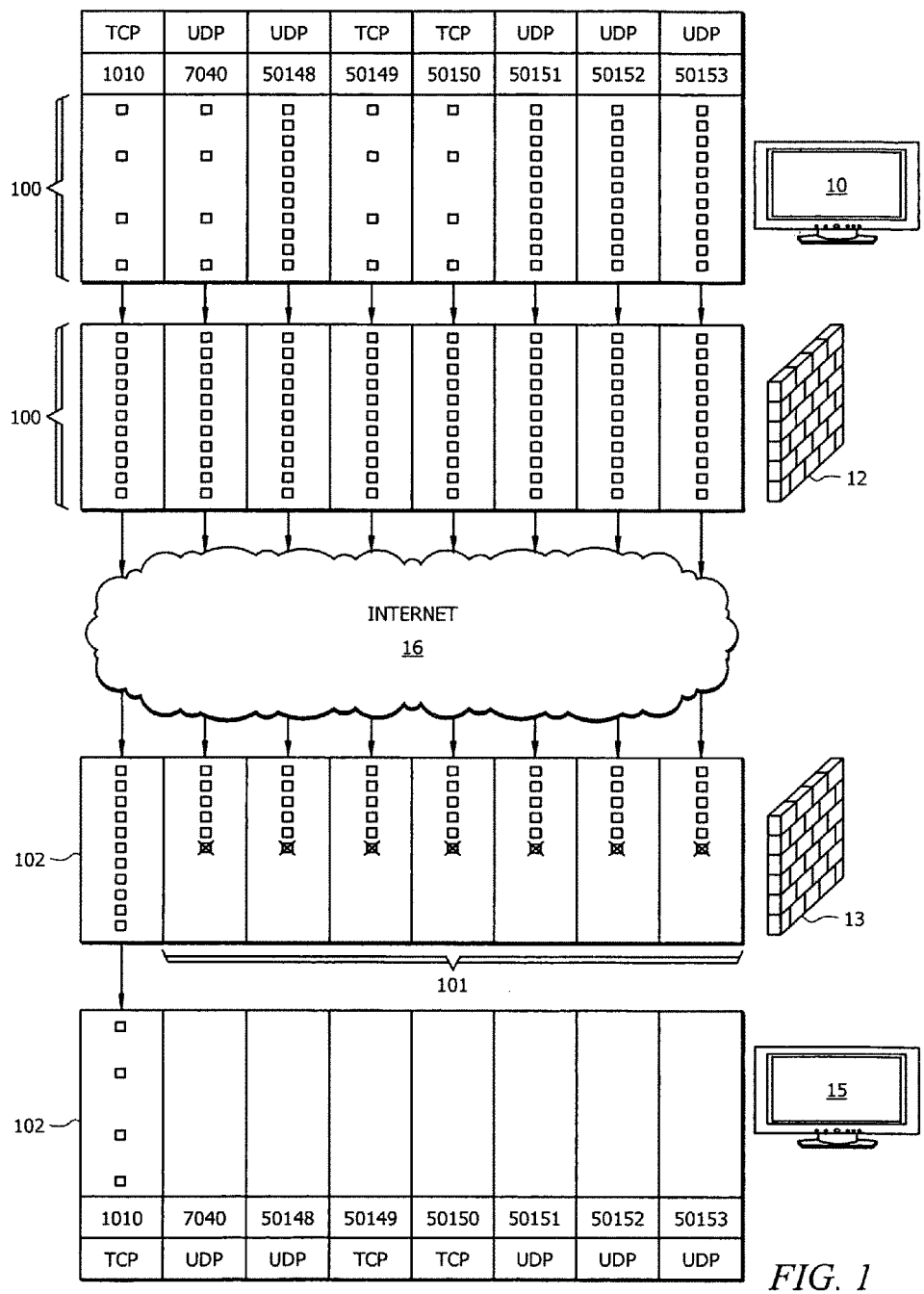
FIG. 1 is a diagram illustrating the flow of packets in a typical IP communication system.

Referring to FIG. 1, video conference endpoint 10 attempts to send multimedia data to video conference endpoint 15. Multiport packets 100 sent from well-known port 1010, registered port 7040, and dynamic ports 50148-50153 are being transmitted to video conference endpoint 15. Firewall 12 passes all the outgoing traffic (packets 100) on all ports since this traffic has originated from the network inside of firewall 12. The traffic is transmitted across Internet 16 and is received by firewall 13, which is operating in a standard mode. In the standard mode, firewall 13 blocks dynamic ports and unrequested traffic (packets 101), such that only the TCP traffic (packets 102) on well-known port 1010 is received by endpoint 15. Thus, with each endpoint being behind their respective firewalls, neither two-way nor one-way communication can take place.

Figure 2:
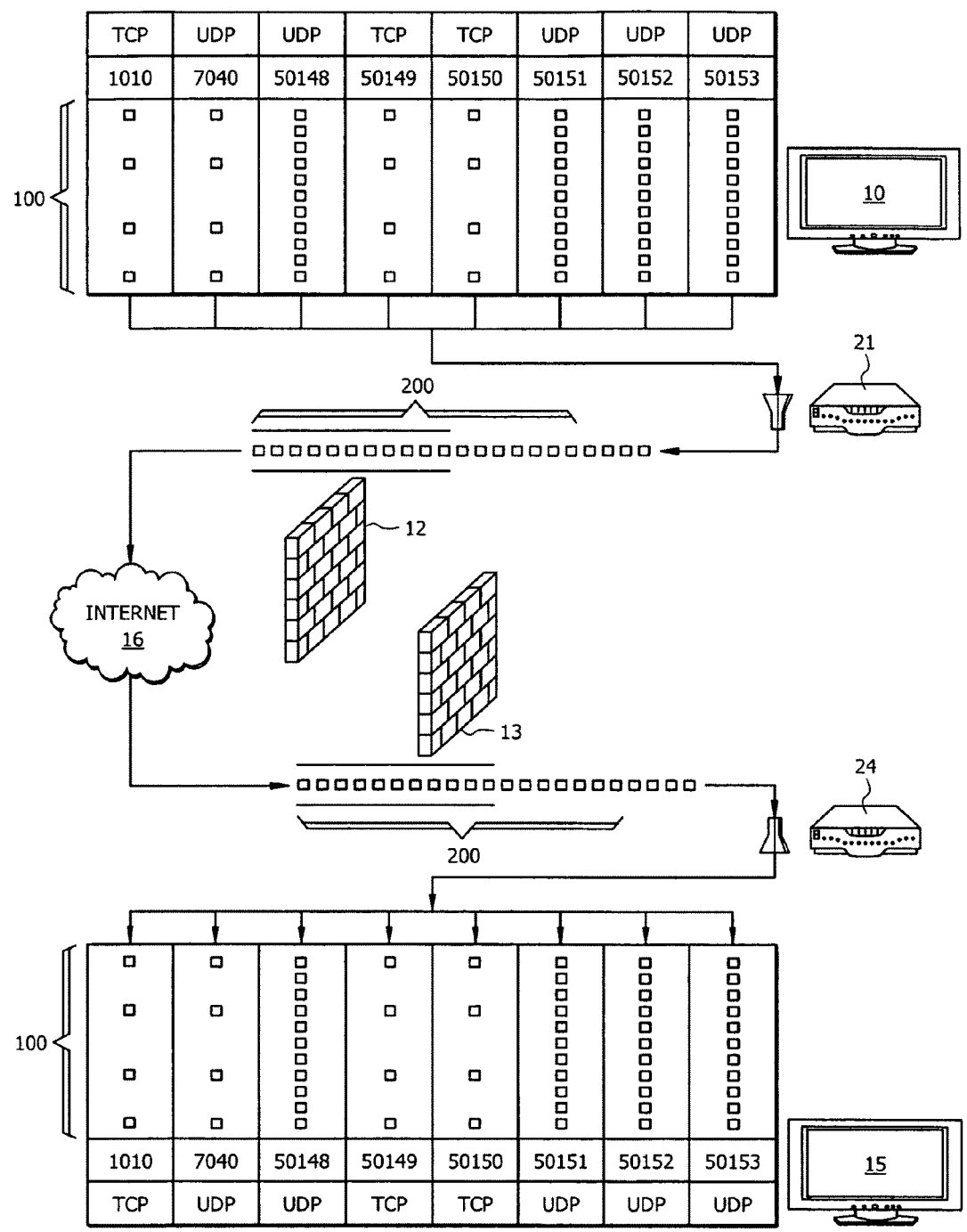
FIG. 2 is a diagram illustrating an IP communication system configured according to one embodiment of the present invention.

Referring to FIG. 2, video conference endpoint 10 again attempts to send multimedia data (packets 100) to video conference endpoint 15, this time with back-end network devices 21 and 24 in the system. Again, each network is protected by a respective firewall. For instance, firewall 12 is implemented for protecting the network on which video conference endpoint 10 resides, and firewall 13 is implemented for protecting the network on which video conference endpoint 15 resides. Each network's firewall restricts certain externally-originated communication from entering the protected network to screen out unwanted or malicious traffic. In addition, the firewall may be configured to restrict what external resources devices within the protected network may be permitted to access.

While FIG. 2 is shown and described as involving communication between video conference endpoints 10 and 15, other endpoint communication devices may be utilized in a given communication session in addition to or instead of such video conference endpoints 10 and 15 in accordance with embodiments of the present invention. The endpoint devices may be any suitable devices that output communication to participants on a call and/or that receive input communication from participants on a call, such as video capture equipment, video display equipment, voice capture equipment, and voice output equipment. Examples of such multimedia endpoint communication devices include telephones, videophones, VoIP phones, etc. The communication endpoint devices may be stand-alone devices or they may be embedded with another device, such as integrated with or implemented on a PC or other processor-based computing device. The communication endpoint devices may be employed for enabling users to communicate with each other during multimedia communication sessions. Such multimedia communication may be conducted via the Internet (e.g., IP-based communication) and/or other communication networks for communicating voice, video, and/or other content (e.g., presentation data, screen-sharing, etc.) between the users during a multimedia communication session established between the users.

In the illustrated example of FIG. 2, communication endpoint 10 is a video conference endpoint that uses a multiple port communication protocol in order to establish communication with communication endpoint 15. For the purposes of this example, endpoint 10 uses ports 1010, 7040, 50148-50153. The data transmitted using ports 1010 and 50149-50150 utilize TCP as the transport protocol while the data transmitted using ports 7040, 50148, and 50151-50153 utilize UDP as the transport protocol. Packets from each of these ports conforming to these various protocols and sub-protocols are received by network device 21, which may be referred to herein as a "back-end" device because it is shown in FIG. 2 as residing behind firewall 12. It should be noted that additional or alternative examples of communication endpoints may use more or fewer ports of different numbers based in part on the applications or protocols used to facilitate multimedia communication.

The received packets are encapsulated to conform to a protocol used by devices 21 and 24 for transmitting data, which may include, but is not limited to: TCP, UDP, Stream Control Transmission Protocol (SCTP), Datagram Congestion Control Protocol (DCCP), Real-time Transport Protocol (RTP), and the like. The protocol used by devices 21 and 24 is referred to herein as a proprietary protocol because it is a protocol that is not natively supported by the endpoint communication devices 10 and 15. Further, as discussed herein, in certain embodiments, such proprietary protocol is a single-port protocol. As further discussed herein, while back-end devices 21 and 24 are shown as separate devices for ease of illustration and explanation in FIG. 2, in certain embodiments, the functionality of such back-end devices 21 and 24 may be implemented within endpoint communication devices 10 and 15, respectively.

In this exemplary embodiment of FIG. 2, back-end device 21 receives packets 100 from endpoint 10 that conform to both TCP and UDP, encapsulates each of multiport packets 100 into single-port packets 200 that conform to a single-port communication protocol used by devices 21 and 24 (the "proprietary protocol"), and sends packets 200 to device 24. The method of encapsulation may comprise using some or all of the information (header and data) within each of packets 100 as the data section for encapsulated packets 200.

The encapsulated packets are sent to device 24 using any of the well-known or registered ports, which are the ports that are typically open in standard firewalls. One such well-known port that could be chosen is port 443, which is commonly reserved for HTTPS traffic by ICANN and is commonly open by default on most firewalls. While the packets may be sent along any of the well-known, registered, or dynamic ports, the preferable port used may be a port that is commonly open on most firewalls in their standard configurations (e.g., the well-known ports, certain registered ports, and the like).

Firewall 12 inspects the traffic from device 21 before sending it out through Internet 16 to device 24. When the traffic arrives at firewall 13, it inspects the traffic, determines that it is valid traffic on a well-known port, and passes it along to device 24.

Device 24 receives encapsulated single-port packets 200 sent from device 21. Device 24 then reconstructs multiport packets 100 using packets 200. Reconstruction may be performed by any suitable method including hash-like functions or tables. As an example, header information within one of packets 200 may be an input to a hash-like function that returns the destination IP address and port numbers for a given packet. In the case of a hash-like table, device 21 may use a portion of the header or data in each of packets 100 as the index of a hash-like table and then convert packets 100 to packets 200. Device 24 upon receiving packets 200, may use a portion of the header or data in each of packets 200 as the index of a hash-like table and then reconvert packets 200 back to packets 100, recovering the original IP addresses and ports based on information stored in the hash-like table.

From the original headers, device 24 determines for each packet that it is for delivery to communication endpoint 15. Device 24 then sends the packets to endpoint 15 using each packet's destination port. Thus, if a port and protocol are advantageously chosen (such as port 443 and Secure Sockets Layer (SSL)), communications traffic from endpoint 10 may be sent to endpoint 15 with no modification or user intervention to traverse firewalls 12 and 13. While one-way communication is described (from endpoint 10 to endpoint 15), it is noted that each of devices 21 and 24 may perform the steps of receiving multiple packets, encapsulation, port translation, decapsulation, and resending multiple packets in order to enable two-way communication between communication endpoints 10 and 15. Additional or alternative embodiments may use any of the well-known or registered ports that are typically or commonly open in standard firewalls to send packets between devices 21 and 24. While any of the well-known, registered, or dynamic ports may be used, it is preferable to select a port that is commonly open in firewalls.

It should be noted that in additional or alternative embodiments of the present invention, network or other errors may occasionally lead to lost or corrupted packets and some protocols (such as TCP) specify that in such cases these lost or corrupted packets be resent, which is at odds with maintaining real-time communication. With real-time communication, current data takes precedence over lost previous data since resent packets of previously lost or corrupt data may arrive too late to be useful. As such, when receiving a request to resend a packet containing real-time data (e.g., data corresponding to the audio or video of the communication) devices 21 and 24 may simply ignore the resend request or, alternatively, send a current data packet masquerading as the previously sent and subsequently lost packet, as alternate data.

While in this exemplary embodiment of FIG. 2, devices 21 and 24 are shown as separate devices, in certain embodiments one or more of the endpoint communication devices 10 and 15 may themselves effectively act as the above-mentioned back-end devices 21 and 24. That is, the functionality of the back-end devices 21 and 24 may effectively be implemented on the communication devices 10 and 15, or integrated within some other device in the flow of the communication, such as devices implementing firewalls 12 and 13, in certain embodiments. For instance, one or more of the endpoint communication devices 10 and 15 may have software loaded thereon (e.g., which may be downloaded from a server residing on Internet 16 or otherwise installed on the endpoint communication devices), which executes to encapsulate multiport protocol communication that is natively output by the endpoint communication devices (e.g., communication 100) into the proprietary protocol (e.g., communication 200) for transmission from the endpoint communication device and which likewise executes to decapsulate received communication that is in the proprietary protocol into the multiport protocol communication that is natively supported by the endpoint communication device.

Also, while in this exemplary embodiment of FIG. 2, devices 21 and 24 are shown as residing behind firewalls 12 and 13, respectively, in other implementations one or both of devices 21 and 24 may instead be implemented as devices that reside outside or in front of the protected networks (i.e., not behind the firewalls). That is, one or more of the protected networks behind firewalls 12 and 13 may not include a back-end device in certain embodiments. As discussed further herein, in certain embodiments, the packets 100 from device 10 may be converted into a tunneling protocol that is used for traversing one or more of firewalls 12 and 13. For example, in one implementation, device 21 is not implemented behind firewall 12, but instead the packets 100 from device 10 are converted to a tunneling protocol for traversing firewall 12. The packets in the tunneling protocol are received by a device outside of the firewalls (e.g., a DVN device as described below), residing in network 16 (not shown in FIG. 2), and such receiving device largely acts as the above-described back-end device 21 to convert the packets into the proprietary protocol. Thus, the packets in the tunneling protocol which are received by the device outside of the firewalls, in network 16 are converted to the proprietary protocol that is not natively supported by the endpoint communication devices 10 and 15 (but which is the protocol supported by the devices 21 and 24). The packets may then be communicated across at least a portion of network 16 (e.g., the Internet) in the proprietary protocol.

If device 24 is implemented behind firewall 13, then the packets in the proprietary protocol are communicated to the device 24, as discussed above. However, if device 24 is not implemented behind firewall 13, then a device outside the firewalls, within network 16 converts the packets from the proprietary protocol to a tunneling protocol (that is supported by the endpoint communication device 15) for tunneling through firewall 13. Further examples of embodiments in which one or more of back-end devices 21 and 24 are not implemented on their respective protected networks are described herein below.

Figure 3:
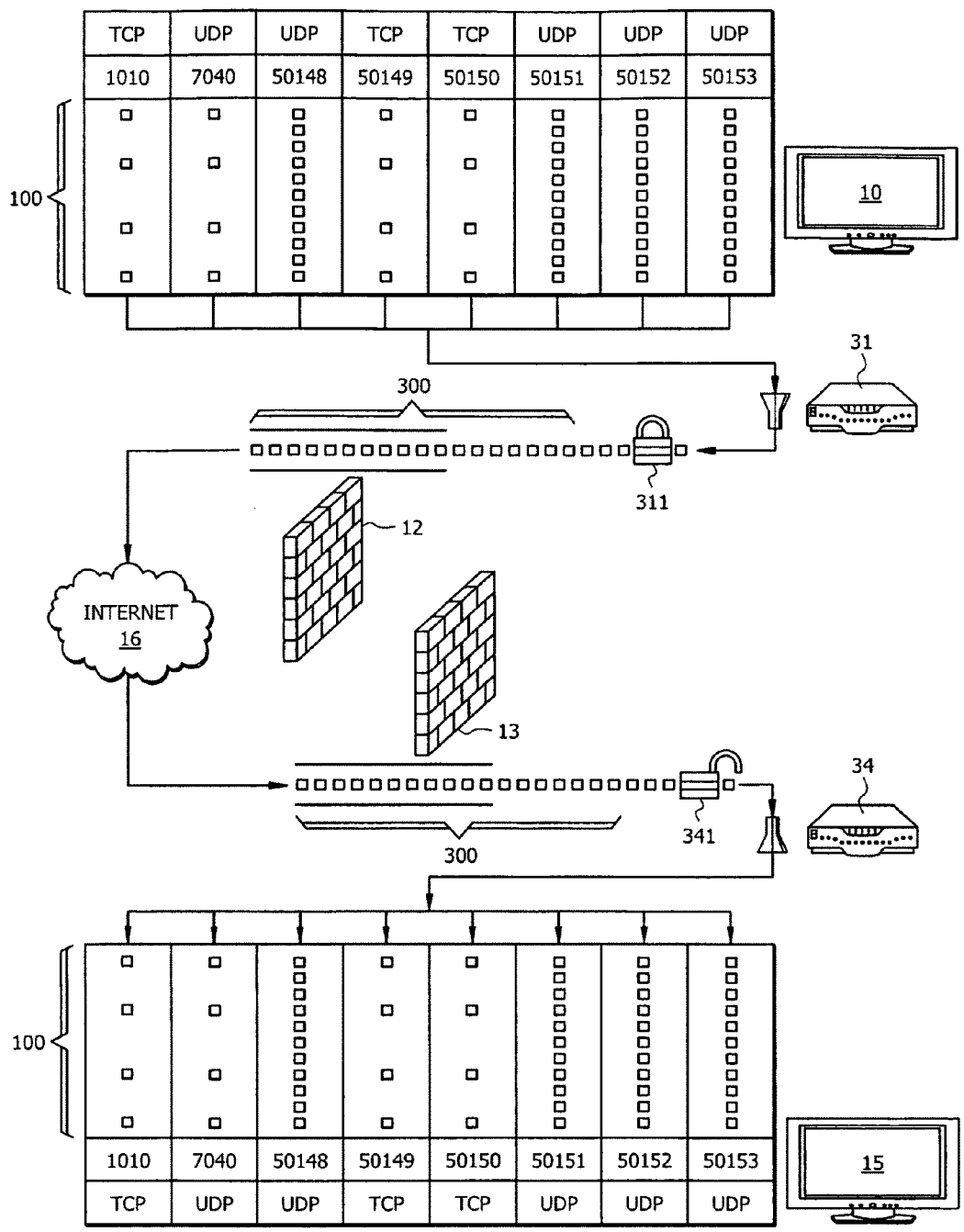
FIG. 3 is a diagram illustrating an IP communication system configured according to another embodiment of the present invention, which includes encryption.

Referring to FIG. 3, device 31 adds encryption layer 311 to the data. Any method or algorithm of encryption may be used including, but not limited to: 128-bit Advanced Encryption Standard (AES); Triple Data Encryption Standard (TDES); Skipjack, or the like. Some or all of each packet received may be encrypted, including the header, which contains the source and destination port numbers associated with the packet. With all of the packets 100 from endpoint 10 having an added layer of encryption and becoming packets 300, the media traffic along with the control traffic between endpoints 10 and 15 are secured for transmission across Internet 16. Device 34 receives secure packets 300 and removes encryption layer 311 before reconstructing packets 100. The reconstructed packets 100 are then dispersed to endpoint 15 addressed to the appropriate ports expected by endpoint 15.

In alternative or additional embodiments, devices 21/31 and 24/34 may also qualify their incoming traffic in order to securely pass traffic associated with the connection between endpoints 10 and 15. As an example, endpoint 10, upon being connected to device 21/31, may register itself with device 21/31 as a video conferencing endpoint. When endpoint 10 begins using network ports for a conference call or other connection, device 21/31 may identify those ports as being used and, if appropriate, begin converting and encrypting the traffic associated with such ports. This qualification and registration process may be performed by the use of a hash-like function, so that device 21/31 may efficiently perform the qualification. As an example, endpoint 10 may register port 50152 and start sending packets. For every packet received, the source IP address and port may be the inputs to a hash-like function that determines whether a received packet is qualified for further processing and transmission. In the case of a hash-like table, device 24 may use a portion of the header or data in each of packets 200 as the index of a hash-like table and then determine whether a packet is qualified based on information stored in the hash-like table.

While each of devices 21 and 24 is depicted connected to a single video conferencing system, they may be connected to multiple and various video conference systems, H.323 gatekeepers, H.323 gateways, SIP proxies, SIP registrars, or the like. When multiple video conferencing systems are connected to a device, such as device 21, any connections or calls that do not require traversing a firewall may accordingly not be converted into a single-port communication protocol. As an example, if two video conference endpoints are on the same network behind a firewall and are engaging in communications, this traffic does not pass through a firewall (the traffic is only transmitted on the internal network). Thus, devices 21/31 may recognize this situation and, accordingly, not encapsulate nor encrypt the traffic between two such endpoints.

Additionally, device 21 need not be a stand-alone device as its functionality may be integrated into any other network device including, but not limited to: video conference systems, firewalls, H.323 gateways, SIP proxies, SIP registrars or the like. Alternative embodiments may also send traffic between endpoints 10 and 15 that conform to any number of standards or protocols for multimedia communication including, but not limited to the H.323 and SIP protocols, by converting the multiport communication protocols into a single-port protocol that uses a port that is typically open on most firewalls.

Further, as mentioned above with FIG. 2, the devices 31 and 34 may in certain embodiments be implemented within other back-end devices, such as within equipment implementing firewalls 12 and 13 or within the communication endpoint devices 10 and 15, as examples. Also, as mentioned above with FIG. 2 and as discussed further below, one or both of devices 31 and 34 may, in certain embodiments, be implemented as front-end devices, rather than as back-end devices. In such a scenario in which one or more of the protected networks do not have a back-end device implemented thereon (but instead devices 31 and/or 34 are implemented as front-end devices), a tunneling protocol may be employed for traversing one or more of the firewalls 12 and 13 in the manner described further herein.

Figure 4A:
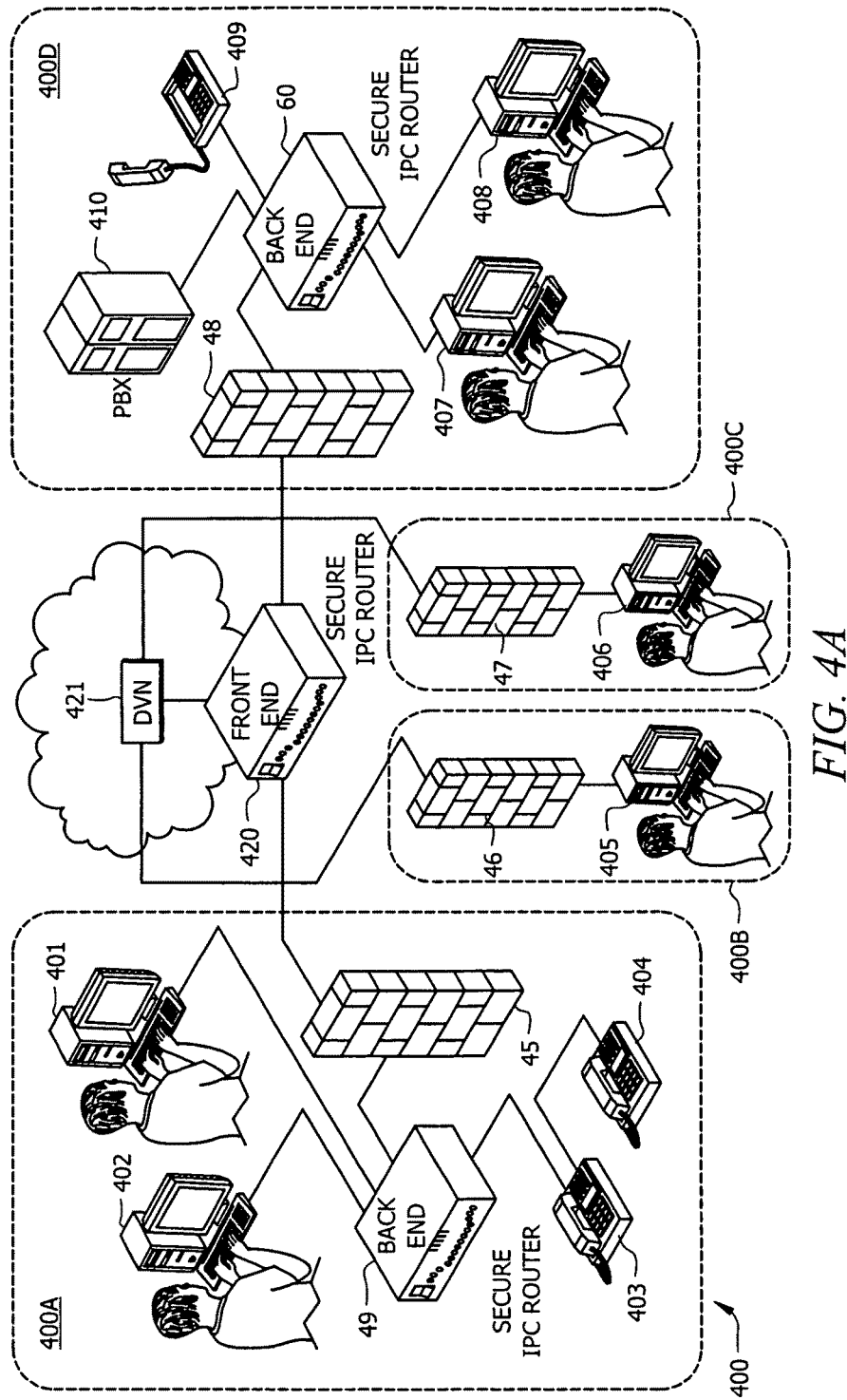
FIG. 4A is a diagram illustrating an exemplary communication system for communicating between disparate protected networks according to one embodiment of the invention.

FIG. 4A shows an end-to-end communication system according to one embodiment of the invention. In FIG. 4A, a communication community 400 is shown. The communication community includes a plurality of disparate protected networks 400A, 400B, 400C, and 400D, which are protected by respective firewalls 45, 46, 47 and 48. One or more communication endpoint devices are connected to each of the protected networks. For instance, exemplary communication endpoint devices 401-404 reside on protected network 400A, communication endpoint device 405 resides on protected network 400B, communication endpoint device 406 resides on protected network 400C, and communication endpoint devices 407-409 reside on protected network 400D (as does PBX equipment 410), in the illustrated example of FIG. 4A.

Communication amongst two or more of the communication endpoint devices residing across the protected networks 400A-400D is facilitated through use of a proprietary protocol. In certain implementations, the proprietary protocol may be a single port protocol as discussed further herein, while in other implementations a proprietary protocol that is not a single port protocol may be used. The proprietary protocol is referred to as such because it is a protocol that is not natively supported by the communication endpoint devices. Some protected networks, such as networks 400A and 400D in the illustrated example of FIG. 4A, have a back-end device (e.g., devices 49 and 60) coupled thereto for converting communications to and from the communication endpoint devices in these networks between the natively supported multiport protocol of such endpoint devices and the proprietary protocol.

The communication endpoint devices in networks 400A-400D natively support (recognize) multiport protocol communications such as H.323 and SIP. As discussed above, such multiport communications are typically blocked by firewalls. In certain implementations, back-end devices are implemented on one or more of the protected networks (such as back-end devices 49 and 60 coupled to networks 400A and 400D, respectively) and employ a proprietary protocol that is a single-port protocol for traversing one or more of the firewalls. Thus, for example, back-end device 49 may convert multiport protocol communication that is natively output from endpoint device 403 to a single-port proprietary protocol, which can traverse firewalls 45, 46, 47, and/or 48 for receipt by one or more of the other protected networks 400B, 400C and 400D. Back-end device 60 may receive the communication in the proprietary protocol and convert it to a multiport protocol recognized by communication endpoint device 407 in network 4004, for example.

As further illustrated in the example of FIG. 4A, some of the protected networks, such as networks 400B and 400C in the illustrated example, may not include a back-end device residing thereon, and thus other methods may be employed in accordance with embodiments of the present invention for facilitating communications to and from the communication endpoint devices residing on those protected networks, such as communication endpoint devices 405 and 406. According to one embodiment of the present invention, one or more front-end devices, such as Dedicated Versatile Network, ("DVN") 421, and front-end controller 420 are employed to facilitate communication in the proprietary protocol. As discussed above, such front-end devices reside in front of the firewalls, rather than residing within one of the protected networks on which the communication endpoint devices participating in a communication session reside. It should be noted that while DVN 421 and front-end controller 420 are shown as separate devices that are communicatively coupled together in the example of FIG. 4A, the functionality of these devices may be combined within a single device. For instance, the functionality of DVN 421 may, in certain embodiments, be implemented within front-end controller 420.

In certain embodiments, front-end controller 420 registers back-end devices, which includes recording the protocols of these back end devices. In one embodiment, the registration process involves the DVN or the back end informing the front end of information pertaining to the DVN and the backend. This information may include, but is not limited to, the DVN's or backend's security keys, private authentication information, dialing numbers, routing information, E.164 digits, names, H.323 IDs, SIP IDs, prefixes etc. The DVN or the back end may provide all this information to the front end controller as a part of a registration table. When the DVN registers to the front end, the DVN provides its table of registered devices to the front end. According to one embodiment, the registration process allows only connected and registered devices to communicate, via the proprietary protocol, with each other.

Figure 4B:
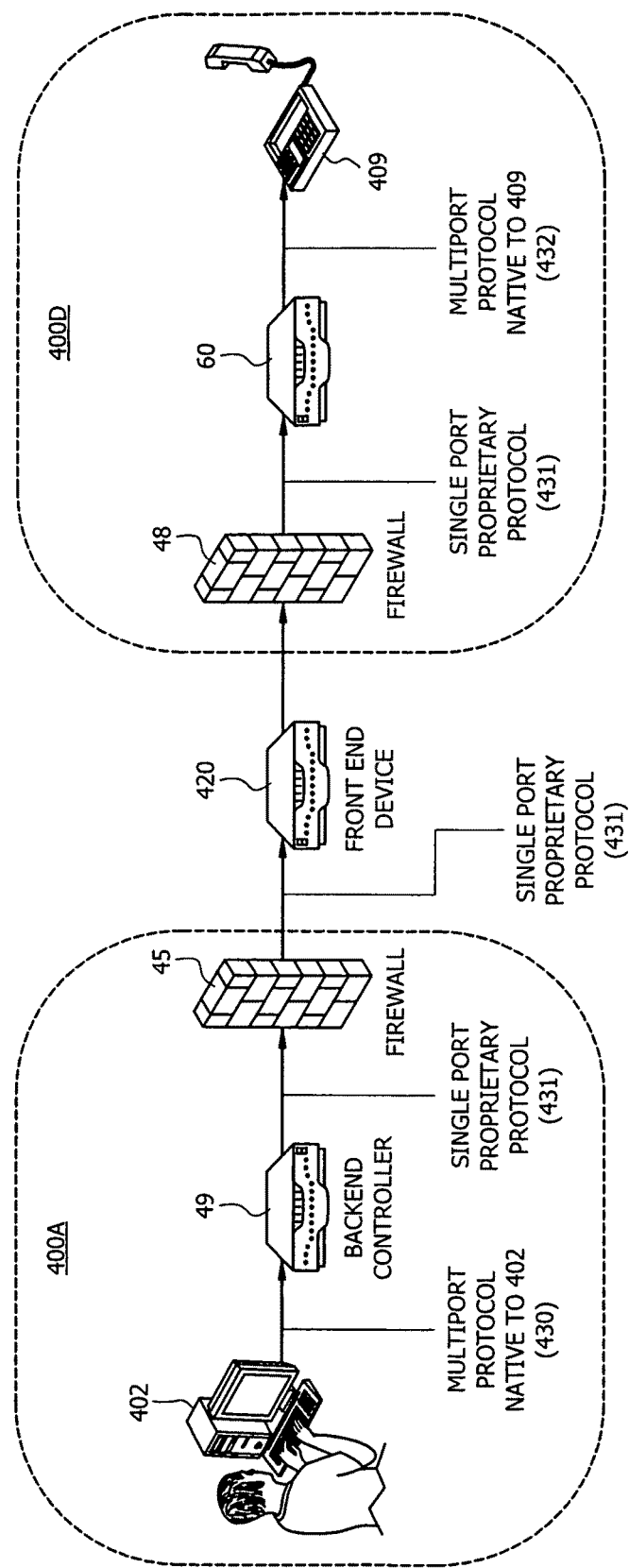
FIGS. 4B-4E show exemplary communication flows between endpoint devices on the protected networks of FIG. 4A in accordance with various embodiments of the present invention.

FIG. 4B shows one exemplary communication flow between communication endpoints on disparate ones of the protected networks 400A-400D according to one embodiment of the invention. In this example, communication flows between communication endpoint devices residing on protected networks that include back-end devices thereon. In particular, the specific example illustrated shows communication between endpoint devices 402 and 409 residing on protected networks 400A and 400D, respectively. Protected network 400A also includes back-end device 49 residing thereon, and protected network 400D includes back-end device 60 residing thereon. Communication endpoint devices 402 and 409 may be any communication device such as a computer, telephone, personal digital assistant, etc.

In the example of FIG. 4B, endpoint device 402 sends communication (e.g., data) 430, which is in a multiport protocol that is native to endpoint device 402. Communication 430 is destined for endpoint device 409. Back-end device 49 receives communication 430 and converts it to communication 431 that is in a single-port proprietary protocol. As discussed further herein, such conversion may be achieved through encapsulating the multi-port communication 430 within a single-port protocol. The single-port proprietary protocol is a protocol understood by back-end devices 49 and 60, as well as front-end device 420, but is not natively supported by (recognized by) communication endpoint devices 402 and 409.

Because the converted communication 431 is in a single-port proprietary protocol, it is able to traverse firewalls 45 and 48. After traversing these firewalls, communication 431 is received at back-end device 60 where it is converted to communication 432, which is in a multiport protocol that is natively supported by communication endpoint device 409. The multiport protocols 430 and 432 that are natively supported by endpoint devices 402 and 409, respectively, may be the same protocols or they may be different. While the example of FIG. 4B shows communication flowing in one direction (from device 402 to device 409), it should be recognized that communication may likewise be flowing in a similar manner bi-directionally. For instance, communication may likewise flow from device 409 to device 402 in a manner similar to that described above, wherein the multiport communication output by device 409 is converted by back-end device 60 into the single-port proprietary protocol, which is used for transporting the communication from protected network 400D to protected network 400A, and the back-end controller 49 converts the proprietary protocol into multiport protocol 430 for receipt by device 402.

Figure 4C:
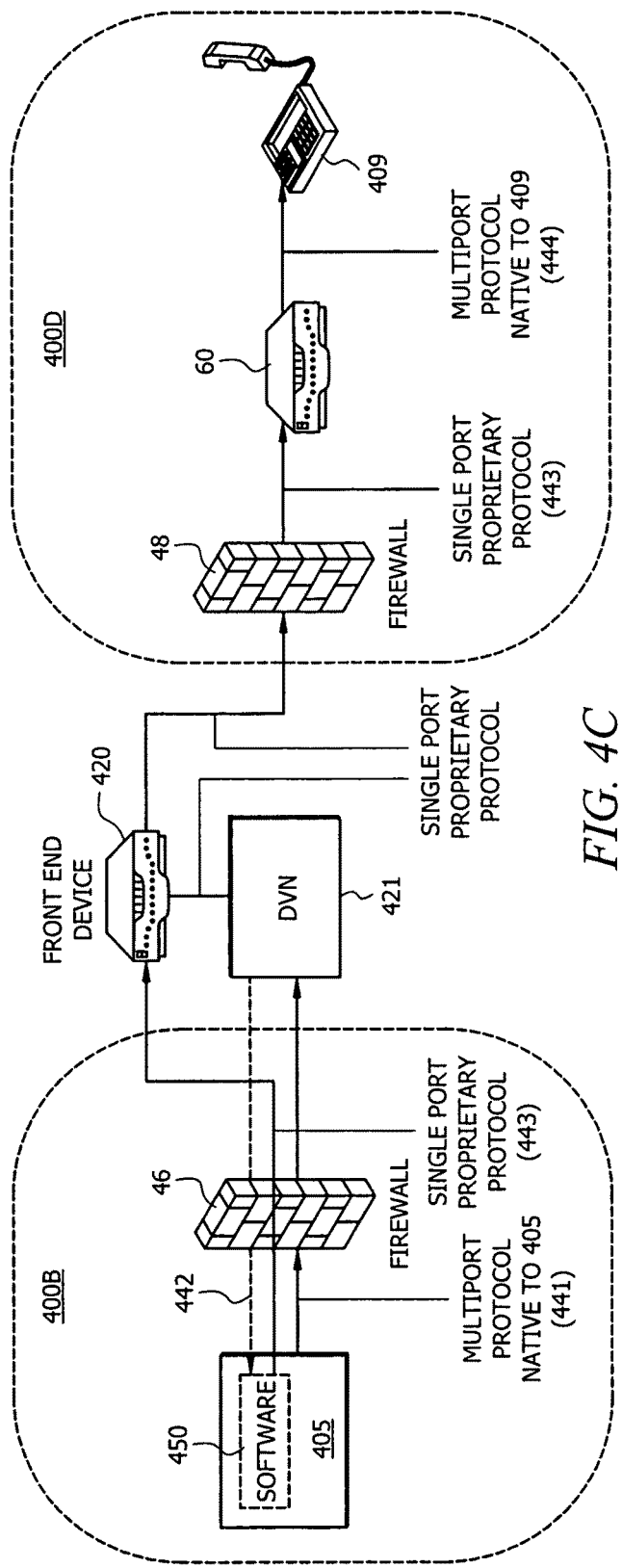

FIG. 4C shows another exemplary communication flow between communication endpoints on disparate ones of the protected networks 400A-400D according to one embodiment of the invention. In this example, communication again flows between communication endpoint devices residing on protected networks that include back-end devices thereon. However, in this example, a separate back-end device is not implemented on one of the protected networks, but instead the back-end device functionality is implemented within a communication endpoint device. In particular, the specific example illustrated in FIG. 4C shows communication between endpoint devices 405 and 409 residing on protected networks 400B and 400D, respectively.

In this embodiment, communication endpoint device 405 resides on protected network 400B, which does not have a separate back-end device residing thereon. Communication endpoint device 405 sends communication 441 (e.g., in a multiport protocol that is native to endpoint device 405) to DVN 421 (or other computer server device) and receives via communication 442 download of software 450 that when installed and executed on communication endpoint device 405 effectively performs the functionality of a back-end device, such as back-end device 49 described above with FIG. 4B. In one implementation, endpoint device 405 may communicate information, via communication 441, to log on to DVN 421. For example, under the control of a user, endpoint device 405 may use a web browser, URL or IP address to establish a connection with DVN 421, or endpoint device 405 may use Virtual Private Network (VPN) technology to communicate with DVN 421, as examples.

DVN 421 may download software 450 to endpoint device 405. Such downloaded software 450 is then executed by endpoint device 405 to perform the functions of a back-end device, such as those described above with back-end device 49 of network 400A. For instance, the software 450 converts the multiport protocol communication that is natively output by device 405 into communication 443 that is in a single-port proprietary protocol. While shown and described in this example as being downloaded via a communication network from DVN 421, in other embodiments, software 450 may otherwise be obtained for execution on endpoint device 405, such as by being loaded to memory on endpoint device 405 from a data storage medium, such as a magnetic or optical disk.

Thus, software 450 acts as a back-end device and converts the communication that device 405 natively outputs in a multiport protocol to communication 443 that is in a single-port proprietary protocol. As discussed further herein, such conversion may be achieved through encapsulating the multiport communication within a single-port protocol. The single-port proprietary protocol is a protocol understood by back-end devices, as well as front-end devices, but is not natively supported by (recognized by) communication endpoint devices (other than those that include software 450 that act as back-end devices).

Because the converted communication 443 is in a single-port proprietary protocol, it is able to traverse firewalls 46 and 48. After traversing these firewalls, communication 443 is received at back-end device 60 where it is converted to communication 444, which is in a multiport protocol that is natively supported by communication endpoint device 409. The multiport protocols that are natively supported by endpoint devices 404 and 409, respectively, may be the same protocols or they may be different. While the example of FIG. 4C shows communication flowing in one direction (from device 405 to device 409), it should be recognized that communication may likewise be flowing in a similar manner bi-directionally. For instance, communication may likewise flow from device 409 to device 405 in a manner similar to that described above, wherein the multiport communication output by device 409 is converted by back-end device 60 into the single-port proprietary protocol, which is used for transporting the communication from protected network 400D to protected network 400B, and the software 450 (acting as a back-end device) converts the proprietary protocol into the multiport protocol that is natively supported by device 405. Also, while only one of the endpoint communication devices in this example is implemented to also execute software 450 and thereby function as a back-end device, in a given communication session, any one or more (e.g., all) of the endpoint devices participating in such communication session may be so implemented.

Figure 4D:
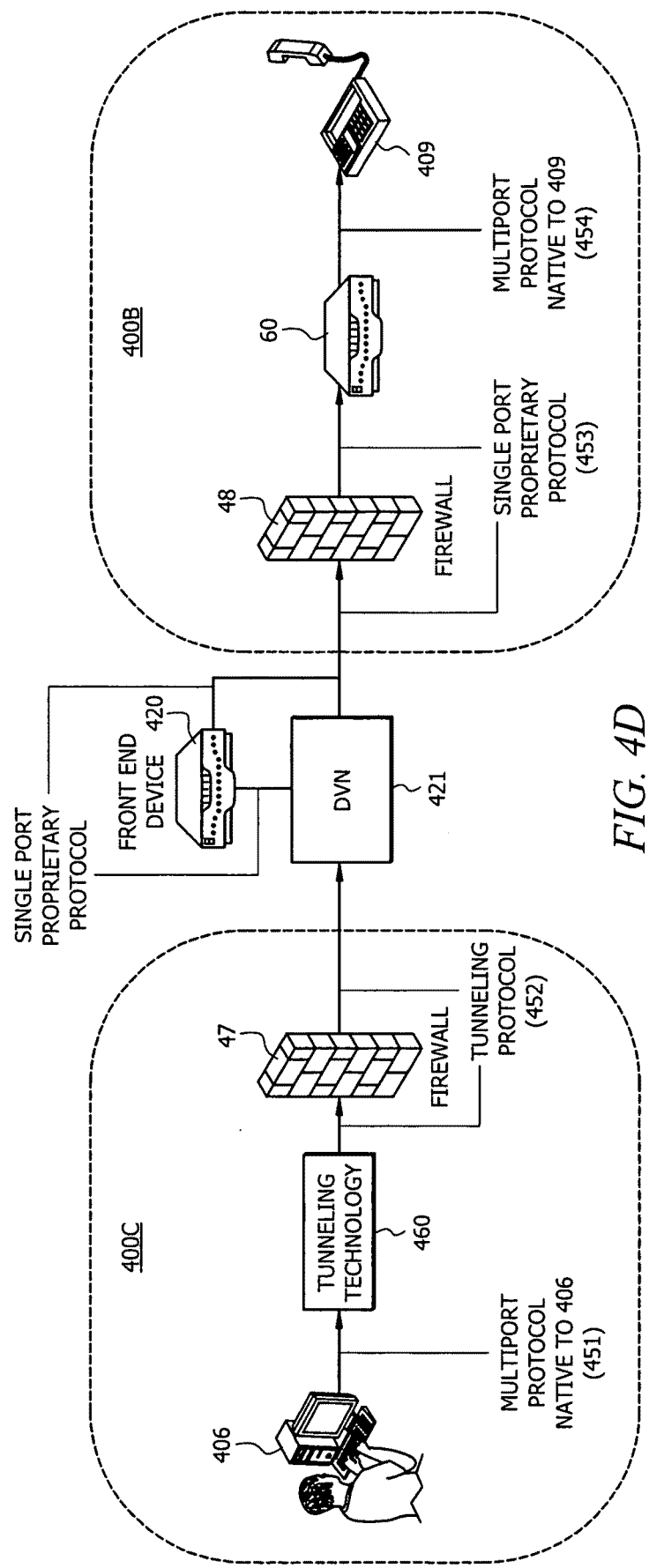

FIG. 4D shows another exemplary communication flow between communication endpoints on disparate ones of the protected networks 400A-400D according to one embodiment of the invention. In this example, communication flows between a first communication endpoint device residing on a first protected network that includes a back-end device thereon (e.g., either a separately-implemented back-end device or one integrated within other equipment on the network, such as implemented on the endpoint device or the firewall equipment) and a second communication endpoint device residing on a second protected network that does not include a back-end device thereon. In particular, the specific example illustrated in FIG. 4D shows communication between endpoint devices 406 and 409 residing on protected networks 400C and 400D, respectively. This example illustrates a scenario such as may be encountered when a company implements back-end devices at various ones of its office locations (e.g., throughout the country), such as back-end device 60 implemented on network 400B which may be a LAN implemented at one of the company's office locations, but an employee of the company who is working from a location at which such a back-end device is not implemented (e.g., at the employee's home, at a hotel, etc.), such as network 400C, desires to use communication endpoint device 406 to join a communication session with other employees who are working from an office location. Of course, the employee could employ the solution described above with FIG. 4C by installing software 450 to the employee's endpoint communication device 406, or the employee could be required to have a separate back-end device to couple to network 400C, such as in the example of FIG. 4B described above. But, FIG. 4D illustrates an alternative solution whereby the employee may join a communication session using endpoint device 406 without requiring any implementation of a back-end device (neither within endpoint device 406 nor a separate back-end device) on network 400C in accordance with one embodiment of the present invention, as discussed further below.

In this example, endpoint communication device 406 natively outputs communication 451 that is in a multiport protocol. To traverse firewall 47 and/or 48 such communication is converted by tunneling technology 460 into communication 452 that is in a tunneling protocol. Tunneling technology 460 refers generally to any software and/or hardware implementation for converting communication to a tunneling protocol. While shown separate from device 406 in FIG. 4D, tunneling technology 460 may be implemented on device 406, or it may be implemented on a separate device to which device 406 is communicatively coupled. As used herein, a tunneling protocol refers generally to any protocol for tunneling through (or traversing) a firewall. In certain embodiments, the tunneling protocol to which multiport communication 451 is converted by tunneling technology 460 is a single-port protocol.

One exemplary implementation that may be employed for tunneling technology 460 is that disclosed in U.S. Patent Application No. 2006/0104288 to Yim et. al. (hereinafter "Yim"), the disclosure of which is incorporated herein by reference. For example, Yim discloses a method that involves intercepting a library call associated with the communication and registering identification associated with the library call. Yim further describes that a Transmission Control Protocol/Internet Protocol (TCP/IP) header is added over a pre-existing header of a data packet that relates to the identification data. In another method, Yim describes transmitting allocation data associated with port traffic to a tunneling driver, segmenting port traffic into datagrams and attaching a TCP/IP header over the first header. These and other tunneling technologies may be used in embodiments of the invention.

Other examples for implementing such tunneling technology 460 include the following protocols: PPTP, L2TP with IPsec, SSTP, Java, PHP, Perl or other scripting languages capable of creating and manipulating sockets. Of course, any tunneling technology for converting multiport communication 451 to a tunneling protocol 452 may be implemented in accordance with embodiments of the present invention.

Endpoint 406 establishes a connection (either a web-based session or client server relationship. By this connection, communication 452 traverses firewall 47. After traversing firewall 47, communication 452 is received by DVN 421. Communication 452 may be directed to DVN 421 because endpoint 406 would have been previously registered with DVN 421, as described above. Because devices such as endpoint device 406 are registered, there is an authentication and security process performed between front end 420 and DVN 421. Thus, endpoint 406 uses a standard VPN or IPsec or other standard protocol for communications between endpoint 406 and the DVN server. The DVN would then translate from the standard VPN or IPsec or other standard protocol to the single port proprietary protocol. The DVN 421 is attached or registered to front end 420 and communications between DVN 421 and front end 420 are in single port proprietary protocol. In other words, DVN 421 receives the communication 452 in the tunneling protocol and converts it to communication 453 that is in the single-port proprietary protocol.

Because the communication 453 is in a single-port proprietary protocol, it is able to traverse firewalls 48. After traversing firewall 48, communication 453 is received at back-end device 60 where it is converted to communication 454, which is in a multiport protocol that is natively supported by communication endpoint device 409. The multiport protocols that are natively supported by endpoint devices 406 and 409, respectively, may be the same protocols or they may be different. While the example of FIG. 4D shows communication flowing in one direction (from device 406 to device 409), it should be recognized that communication may likewise be flowing in a similar manner bi-directionally. For instance, communication may likewise flow from device 409 to device 405 in a manner similar to that described above, wherein the multiport communication output by device 409 is converted by back-end device 60 into the single-port proprietary protocol, DVN 421 converts the communication from the proprietary protocol to a tunneling protocol which is used for traversing firewall 47, and the tunneling technology 460 converts the tunneling protocol into the multiport protocol that is natively supported by device 406.

Also, while only one of the endpoint communication devices in this example resides on a protected network that does not include a back-end device, in a given communication session, any one or more (e.g., all) of the endpoint devices participating in such communication session may be so implemented. Thus, for instance, FIG. 4E shows an exemplary communication flow between endpoint devices residing on disparate protected networks that do not have back-end devices implemented thereon.

Figure 4E:
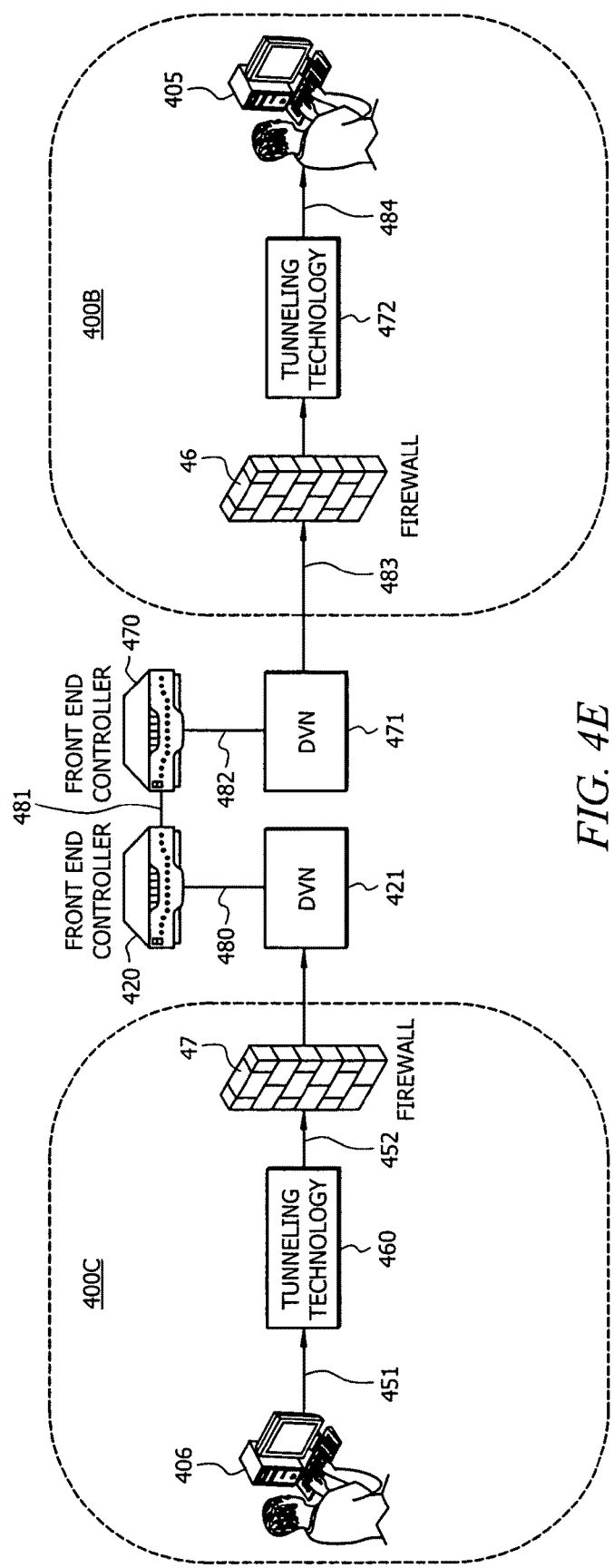

Thus, FIG. 4E shows another exemplary communication flow between communication endpoints on disparate ones of the protected networks 400A-400D according to one embodiment of the invention. The specific example illustrated in FIG. 4E shows communication between endpoint devices 406 and 405 residing on protected networks 400C and 400B, respectively.

In this example, endpoint communication device 406 natively outputs communication 451 that is in a multiport protocol. To traverse firewall 47 and/or 46 such communication is converted by tunneling technology 460 into communication 452 that is in a tunneling protocol, as discussed above with FIG. 4D.

After traversing firewall 47, communication 452 is received by DVN 421, and as discussed above with FIG. 4D, DVN 421 converts the communication to the proprietary protocol. In the example of FIG. 4E, the converted communication 480 in the proprietary protocol is then communicated via a first front-end controller 420 to a second front-end controller 470 (as illustrated via communication 481). This transports the communication across a communication network (e.g., the Internet) toward the destination protected network 400B. The front-end controller 470 sends the communication (shown as communication 482) to DVN 471, which converts the communication from the proprietary protocol to communication 483 that is in a tunneling protocol for traversing firewall 46.

This conversion from communication 480 to 483 is possible because controller 470 knows from the registration process that communication is destined for a protected network that does not have a back-end device. In other words, DVNs 421, 471 informs the front ends 42, 470 of the specific information relating to the devices in the protected network such as, the secure authentication information, their dialing numbers, their E.164 digits, their names, H.323 IDs, SIP IDs, prefixes etc. this information is given to the front end from the DVN as a part of their registration table.

The communication 483 in the tunneling protocol traverses firewall 46, and tunneling technology 472 converts the communication from the tunneling protocol to communication 484 that is in the multiport protocol natively supported by endpoint device 405. Such communication 484 is then received by the endpoint device 405.

While the example of FIG. 4E is described above for communication flowing in one direction (from device 406 to device 405), it should be recognized that communication may likewise be flowing in a similar manner bi-directionally. For instance, communication may likewise flow from device 405 to device 406 in a manner similar to that described above, wherein the multiport communication output by device 405 is converted by tunneling technology 472 to a tunneling protocol, DVN 471 converts the communication from the tunneling protocol to the proprietary protocol which is used for transporting the communication to through front-end controller 470 to front-end controller 420, DVN 421 then converts the proprietary protocol to the tunneling protocol for traversing firewall 47, and the tunneling technology 460 converts the tunneling protocol into the multiport protocol that is natively supported by device 406.

Also, while the examples described above with FIGS. 4B-4E each describe communication flows between two communication endpoint devices for ease of discussion, it should be recognized that any number of communication endpoint devices residing across any number of different protected networks may be communicating with each other in a given communication session. Further, in a given communication session, endpoint communication devices and protected networks of any type described above may be participating. For instance, in a given communication session between three communication endpoint devices, a first endpoint device may reside on a first protected network that has a separate back-end device coupled thereto, a second endpoint device may reside on a second protected network that does not have a separate back-end device coupled thereto but instead the second endpoint device may itself have software 450 installed thereon to act as a back-end device, and a third endpoint device may reside on a third protected network that does not have any back-end device implemented thereon but instead tunneling technology and DVN may be employed as discussed above. Thus, any of the various different techniques may be employed to facilitate each of the endpoint devices to join a communication session with each other, where a proprietary protocol is utilized for transporting the communication at least part of the way between the disparate protected networks.

One of the advantages of converting from the tunneling protocol to the proprietary protocol for transport of the communication at least a part of the way between the disparate protected networks (instead of using tunneling technology only), in accordance with certain embodiments disclosed herein, is that it facilitates transparency. That is, a user can join a communication session within a "communication community" that implements the proprietary protocol. For example, a user can join the communication community and communicate with other users whose endpoint devices reside on networks having back-end devices implemented thereon). Another advantage is that security may be improved through use of the proprietary protocol (at least during the time that the communication is being transported in that proprietary protocol). A further advantage is the creation of a gateway for disparate technologies. For example, DVNs may be listening for many different standard protocols that are used in traversing firewalls such as IPsec, PPTP, or L2TP tunnels. Thus, there may be one end point from one facility that uses an IPsec standard tunnel for communicating with the DVN. There could be another end point from another facility that may be using the L2TP protocol to connect to the DVN. Therefore, converting from the tunneling protocol to the proprietary protocol facilitates traversal and communication to the DVN to create a gateway for those disparate technologies because either of the IPsec and the L2TP protocols wouldn't normally be able to communicate with each other. As such, converting them into a proprietary protocol effectively creates a gateway for disparate technologies.

However, converting from the tunneling protocol to the proprietary protocol creates interoperability between, for example, an PPTP tunnel to an L2TP tunnel. Therefore, in certain embodiments of the current disclosure, these two technologies are not just being gatewayed, one technology is being received and converted into a proprietary protocol technology, and vice versa on the other end, and because the different technologies have been converted to the proprietary protocol, the interoperability issue is solved allowing the different technologies to interface.

Another benefit of converting from tunneling protocol to proprietary protocol in accordance with certain embodiments is that once communication is in the proprietary protocol then it is possible for the system to translate a given communication protocol, such as H.323 protocol to a SIP protocol, and vice versa. It should be noted also that the devices that communicate in the standard technologies might not be as secure as the DVN server itself. Moreover, there is no bridging of networks having disparate technologies, and conversion to the proprietary protocol simplifies this process and adds an additional layer of encryption.

An overall benefit of certain embodiments of the current disclosure is that a community of registered users may be formed and the users are able to communicate by a proprietary protocol, beyond merely tunneling through firewalls or using other technologies to traverse firewalls.

It should be noted that though the communications discussed herein are primarily with respect to video conferencing, voice over Internet Protocol (VoIP), and data over Internet Protocol applications such as H.323 and SIP protocols, which typically allow for multimedia communication including voice, video, and data communications in real-time, the invention encompasses other communications, such as HTTP, HTTPS, FTP, TFTP, SSH, TELNET and SNMP, that are not in real-time such as communications for managing operations like scheduling, configuring and updating software of nodes or endpoint devices in protected networks as disclosed in co-pending and commonly-assigned U.S. patent application Ser. No. 12/505,268, filed Jul. 17, 2009, entitled "SYSTEMS AND METHODS FOR MANAGEMENT OF NODES ACROSS DISPARATE NETWORKS," the disclosure of which is incorporated herein by reference.

Figure 5:
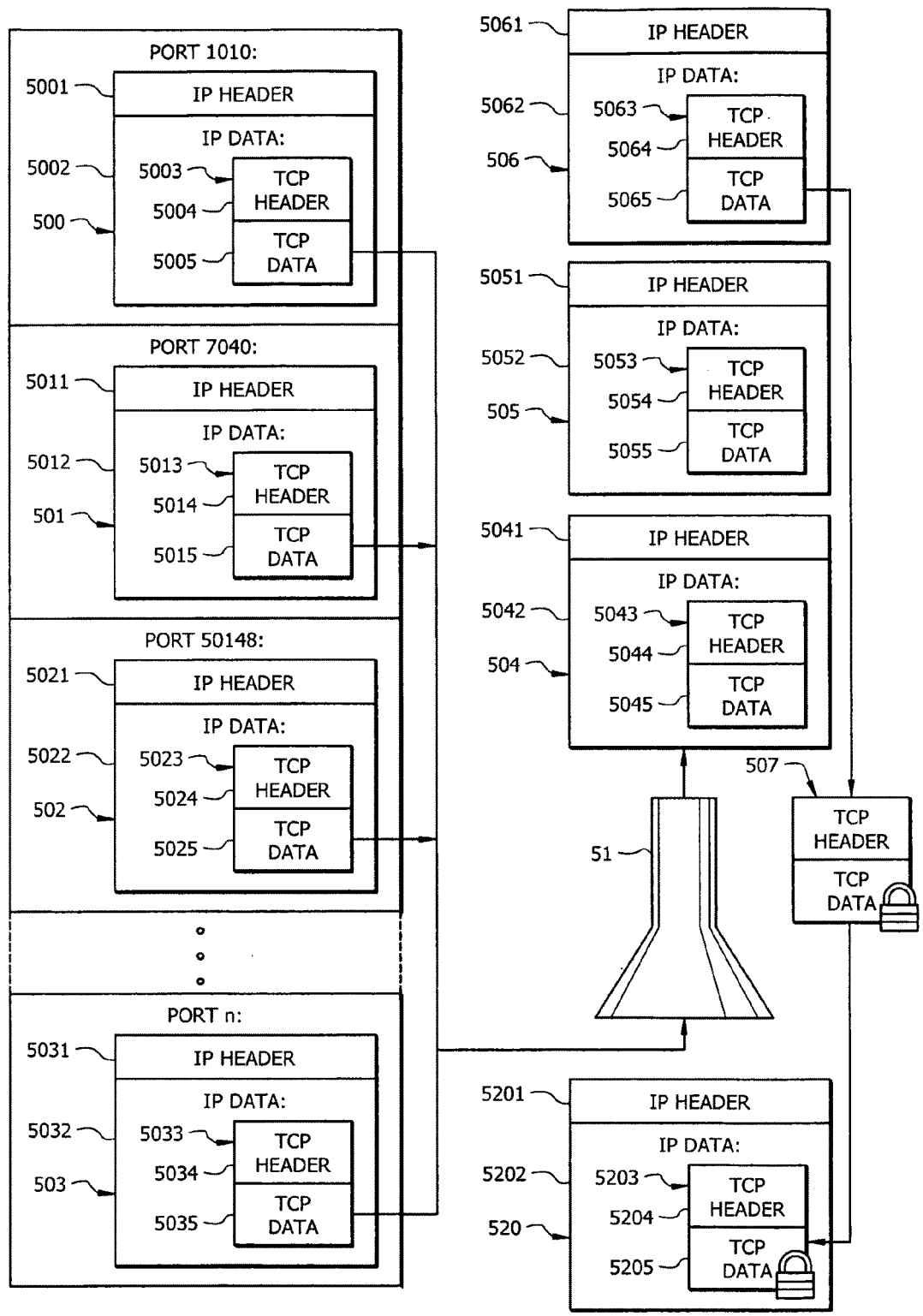
FIG. 5 is a diagram illustrating the handling of packets.

FIG. 5 is a diagram illustrating the handling of packets for converting between a multiport protocol and a single-port proprietary protocol in accordance with one embodiment of the present invention. A device for performing such conversion may, in certain embodiments, receive multiple IP data packets (500-503) from multiple ports (1010, 7040, 50148, . . . , n). Each packet has an IP header (5001/5011/5021/5031) and an IP data section (5002/5012/5022/5032). The IP header contains information for properly delivering a packet to a destination including, among other things: a source IP address, a destination IP address, and the total length of the packet. The IP data section contains the data being transmitted, which is usually another packet conforming to a different protocol such as TCP, UDP, or the like. The TCP and UDP packets (5003/5013/5023/5033) found within IP packets 500-503, each also have header (5004/5014/5024/5034) and data (5005/5015/5025/5035) sections. Headers 5004/5014/5024/5034 of TCP and UDP packets 5003/5013/5023/5033 have the source and destination ports of a packet.

Examples of the operations of the management systems for endpoint communication devices are disclosed in U.S. patent application Ser. No. 12/505,268, the disclosure of which is incorporated herein by reference, and include a secure node manager or secure endpoint manager (SEM) being implemented for managing endpoint devices across disparate networks. SEM receives communication in whatever protocol is used by the management system and communicates the received information to the destination endpoint devices. Additionally, SEM may manipulate the communication, such as by encapsulating the communication in a carrier protocol, for traversing firewalls of protected LANs. In sum, management systems such as SEM involve the use of various communication protocols and, as such, the concepts disclosed herein for communication across disparate networks also apply to communication protocols HTTP, HTTPS, FTP, TFTP, SSH, TELNET and SNMP which are used in management systems such as SEM.

In management system implementations of the current disclosure, a SEM and/or endpoint devices managed by the SEM may communicate to another SEM, endpoint devices managed by or not managed by a SEM and endpoint devices with or without backends. The SEM and endpoint devices may use the techniques described with respect to FIGS. 6A-6E.

Each packet received is treated the same regardless of the packet's source port or to which protocol the packet conforms. After being received, each IP packet's data section (5042/5052/5062) may be encrypted and then become the data section of a new packet, which may conform to a different protocol for single-port communication. As an example, packet 507 is the encrypted TCP packet 5063 of IP packet 506. IP packet 520 contains TCP packet 5203, whose TCP data section 5205 is packet 507. This method allows the original source and destination ports identified in packet 506's TCP header to be saved and also encrypted such that when packet 520 is transmitted across the Internet, it may not be identified as using a port associated with video conferencing, further increasing security. Additionally, in creating a new TCP packet, the port address may effectively be changed. As an example, a packet received from port 1010 could be sent out on port 443, with the original source port being saved in an encrypted form within packet 507. TCP data section 5205 of packet 520 may also contain encrypted or non-encrypted UDP packets, RTP packets, or IP packets instead of the encrypted TCP packet portrayed. As an example, IP packet 506 may be the TCP data 5205 of packet 520. Accordingly, additional or alternative embodiments may encrypt the entire IP packet (504-506) instead of or in addition to the IP data sections (5042/5052/5062).

Figure 6A:
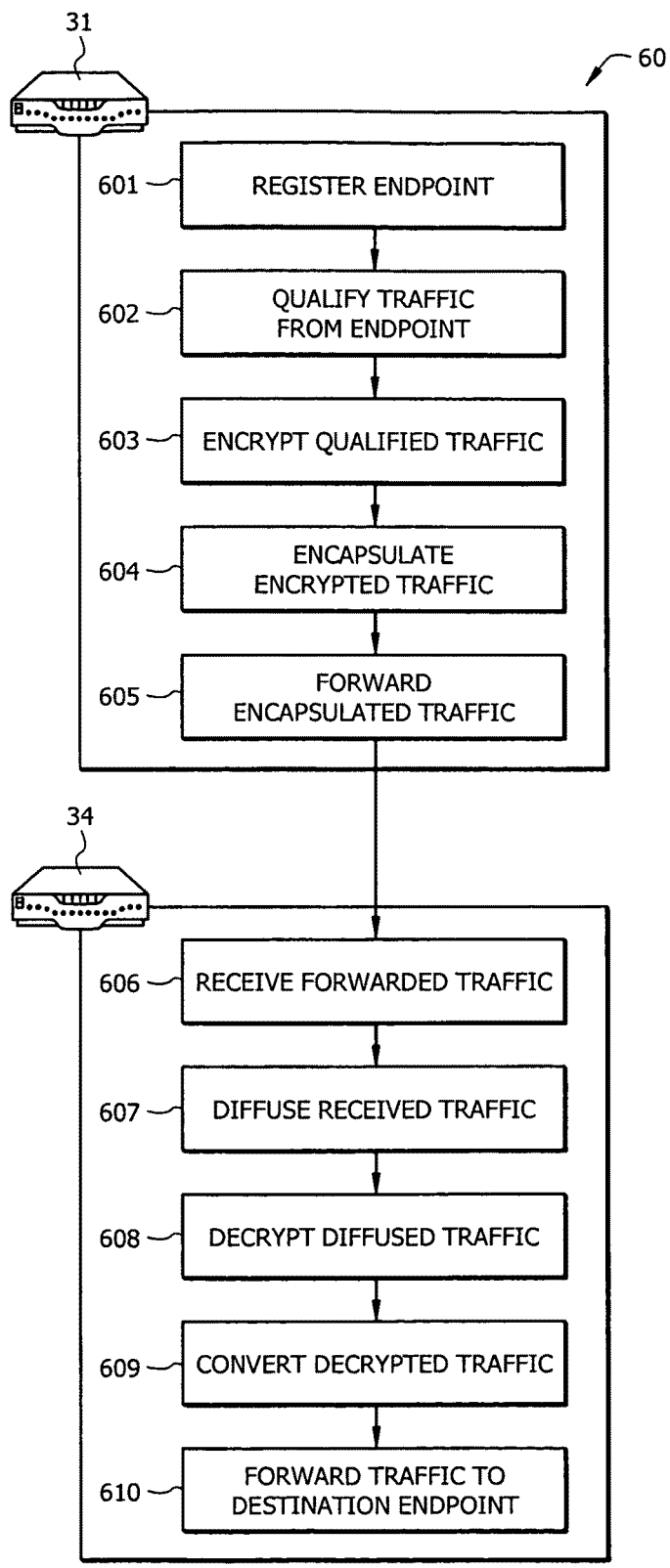
FIGS. 6A-E show embodiments of the invention in the form of system diagrams and flowcharts of example steps of how the systems may operate.

FIG. 6A is a flowchart that shows for an embodiment of the invention, example steps that may be employed for converting between multiport protocol communication and a single-port proprietary protocol in accordance with one embodiment of the present invention where the endpoint device utilize backend devices for communication. In the illustrated example, the operations are shown as being performed by back-end devices 31 and 34 of FIG. 3), but as discussed further herein, in certain embodiments all or a portion of the actions may be performed by back-end software implemented on an endpoint communication device or by a front-end device. In the example of FIG. 6A, a communication endpoint device, when connected to a network, first registers with device 31 by the endpoint identifying itself as a compliant endpoint (e.g., it is an endpoint that conforms to H.323, SIP, VoIP, or the like), as shown by step 601.

On a given network, multiple devices may be connected, as such, device 31 may receive traffic from many devices within that network. Thus, device 31 qualifies the traffic it receives to ensure that the traffic sent to device 34 is appropriate traffic. This is shown in step 602 and may be accomplished by comparing a given packet's source IP and port addresses to those of endpoints that have registered with device 31. In step 603, device 31 encrypts the previously qualified traffic securing the communication between two endpoints using any suitable encryption method including, but not limited to: AES (such as AES 128-bit, AES 256-bit), TDES, Skipjack, or the like. In step 604, the encrypted traffic is then encapsulated to conform to a single-port proprietary protocol, such as "TLS/SSL," by placing the previously encrypted packet into a new packet conforming to "TLS/SSL" protocol. As shown by step 605, the encapsulated traffic is then forwarded to device 34.

In step 606, device 34 receives the single-port traffic from device 31 and is diffused by step 607 by restoring the original IP addresses and port numbers to the individual packets. In step 608, this diffused traffic is then decrypted, thus recovering the original multimedia and control communication information within the packets. In step 609, the packets are then restored to their original transport protocol, such as TCP, UDP, or the like. With the packets being fully restored, they are then forwarded to the destination endpoint by device 34, as shown by step 610.

Figure 6B:
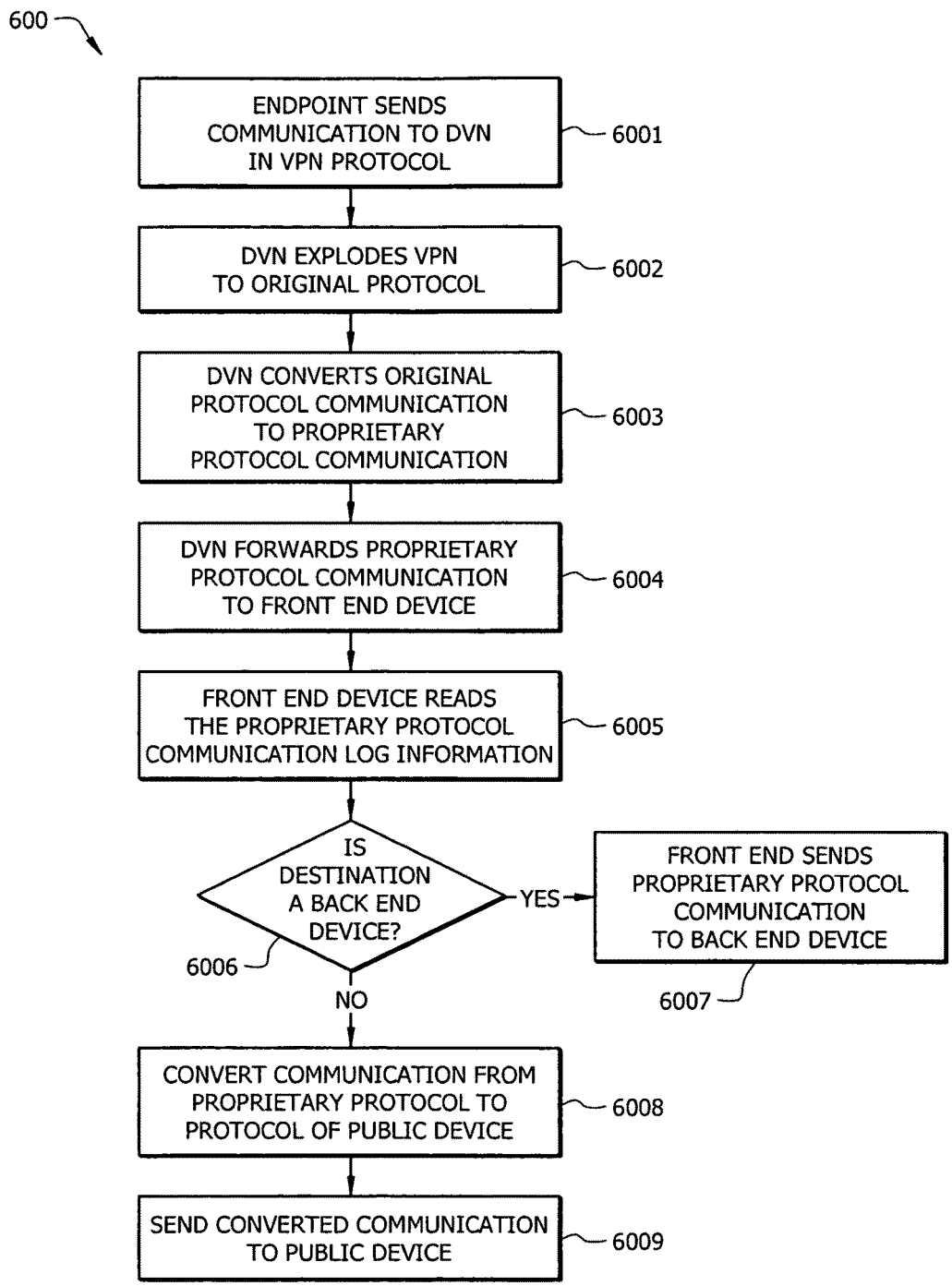
Figure 6C:
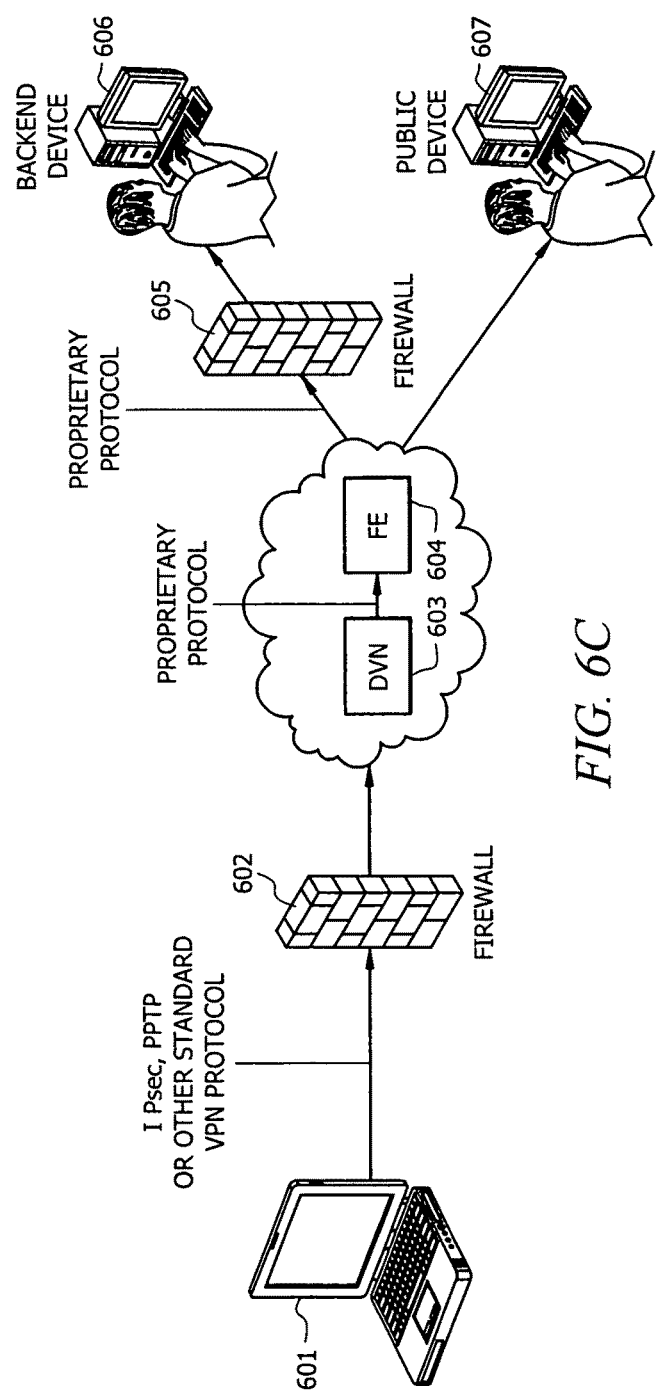

FIG. 6B illustrates one embodiment of the invention in the form of a flowchart that shows example steps of operations being performed by a system shown in FIG. 6C, which depicts another embodiment of the invention. In the illustrated example, endpoint device 601 sends a communication to DVN 603 in step 60001. This communication traverses firewall 602 in IPsec, PPTP or other standard VPN protocol. In step 6002, DVN 603 explodes the VPN protocol to endpoint device 601's original native protocol. DVN 603 converts the original native protocol to a proprietary protocol, in step 6003. In step 6004, the DVN forwards the proprietary protocol communication to front end device 604. Front end device 604 then reads the proprietary protocol log information of the communication in step 6005. In step 6006, a determination is made, based on the protocol log information whether the destination of the communication is a back end device. If the communication is destined for a backend device, front end device 604 sends the communication in proprietary protocol format, which traverses firewall 605, on its way to back end device 606. If the communication is not destined to a front end device, and instead is destined to a public device (a device that is not protected by a firewall), in step 6008, front end 604 converts the communication in proprietary protocol format to the protocol of the public device which may be the original native protocol from endpoint device 601. In step 6009, front device 604 sends the converted communication to public device 607.

Figure 6D:
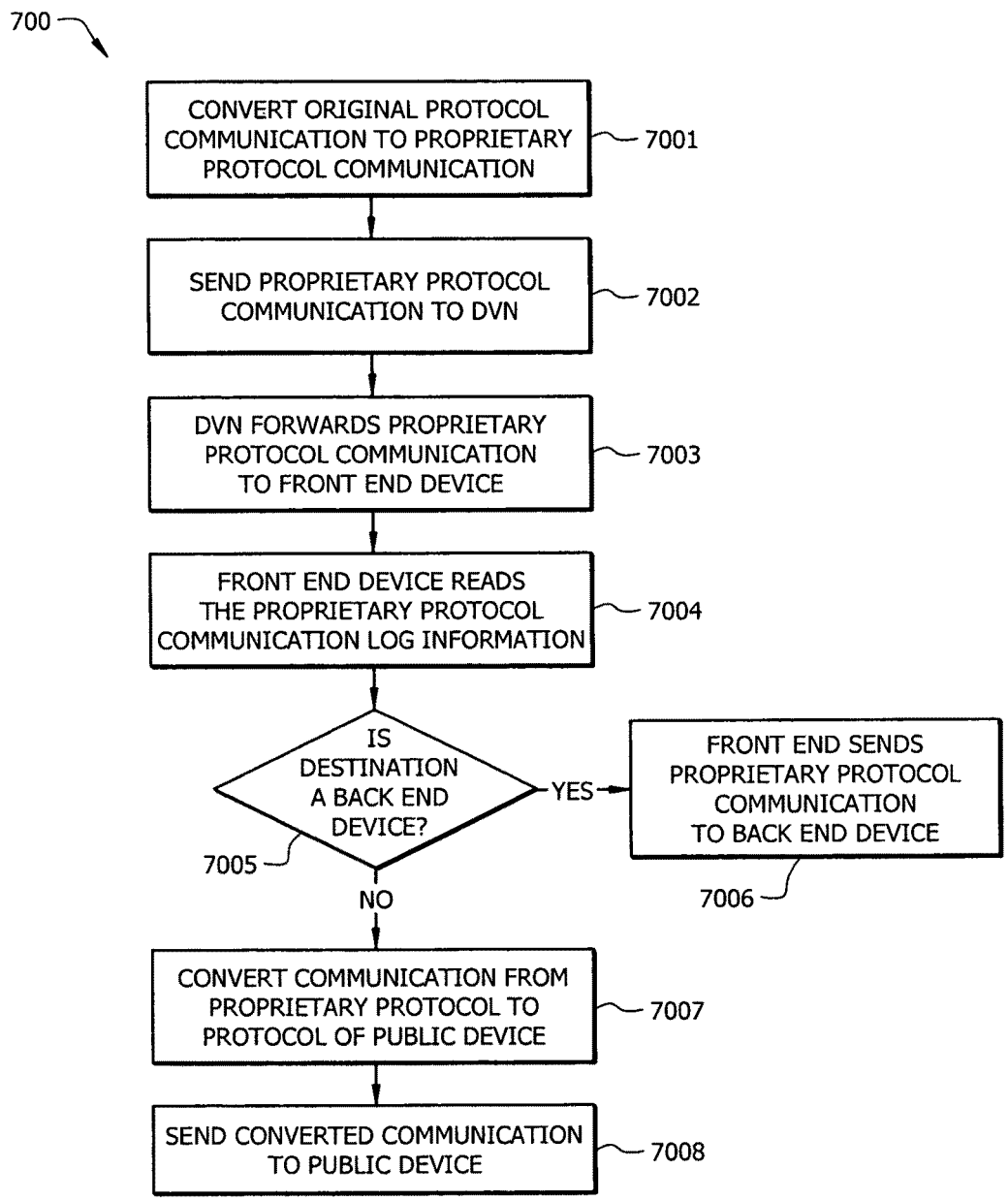
Figure 6E:
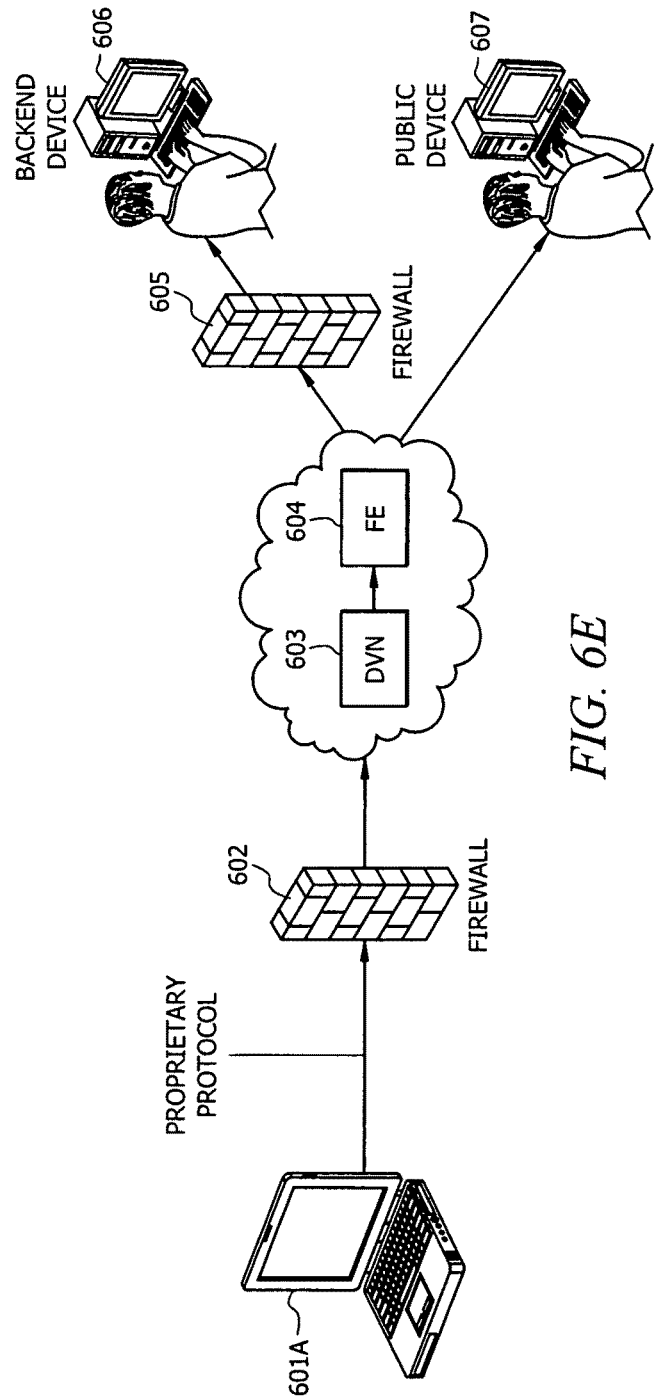

FIG. 6D illustrates one embodiment of the invention in the form of a flowchart that shows example steps of operations being performed by a system shown in FIG. 6E, which depicts another embodiment of the invention. In this example, endpoint device 601A uses software to convert a communication in its original native protocol to a proprietary protocol, in step 7001. For example, the conversion in step 7001 may be from H.323, FTP or telnet to a proprietary protocol. This communication in proprietary protocol traverses firewall 602 on its way to DVN 603, in step 7002. In step 7003, the DVN forwards the proprietary protocol communication to front end device 604. Front end device then reads the proprietary protocol log information of the communication in step 7004. The process then proceeds in steps 7005-7008 as described above for steps 6006 to 6009.

It is noted that while the disclosure has used the communication between two video conference endpoints as an example, it is understood that the systems and methods described may be used by other programs, applications, communications systems, and the like, that use multiport protocols for communication. As such, embodiments of the invention may be used for audio systems VoIP systems, or any other system that uses a multiport protocol to transfer data between devices. Referring back to FIG. 2 as an example, endpoints 10 and 15 may be VoIP endpoints engaging in voice communication. In this embodiment the multiport VoIP protocol traffic from endpoint 10 may be received by device 21, converted to a single port protocol by device 21, encapsulated by device 21, transmitted to device 24, decapsulated by device 24, converted back to the original multiport protocol by device 24, transmitted to endpoint 15, and received by endpoint 15, as described in further detail above. The same holds true for other types of programs, equipment, or applications using a multiport protocol to transfer data across a network.

Figure 7:
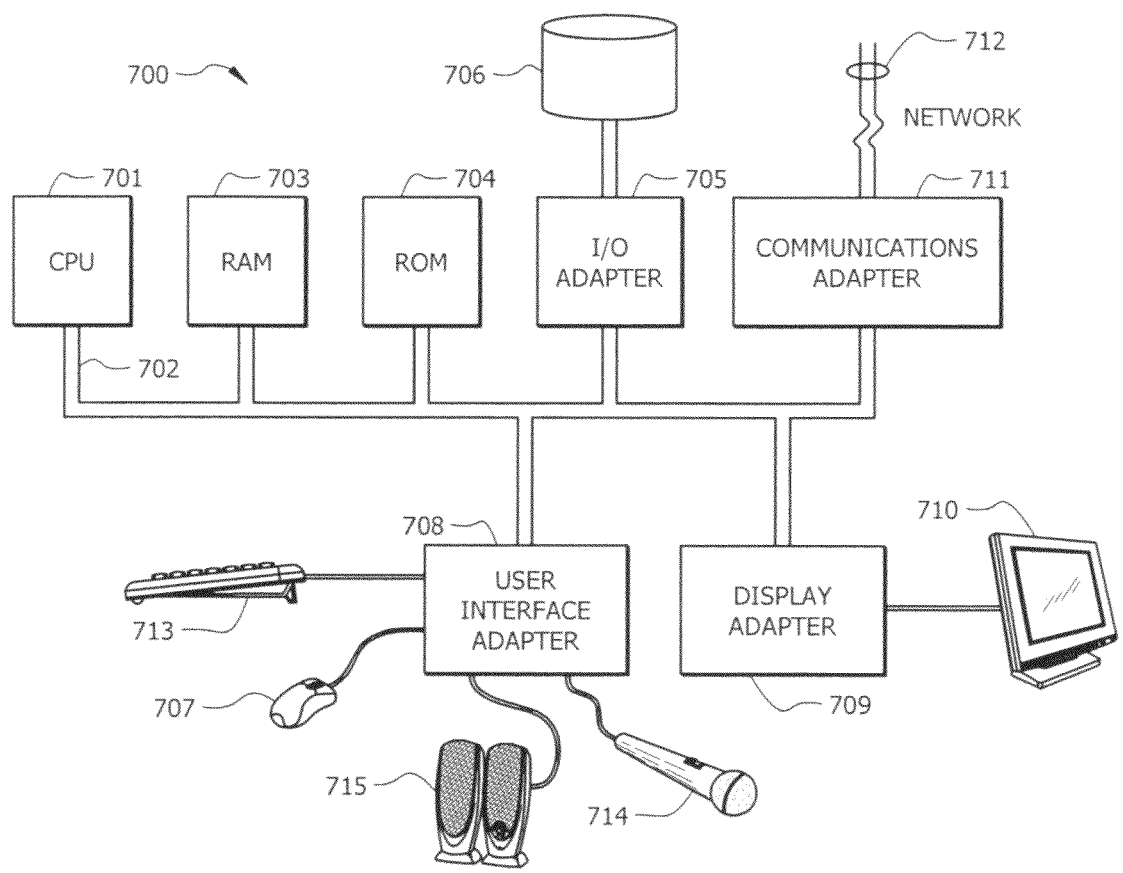
FIG. 7 is a system according to one embodiment of the invention illustrates a computer system adapted to use embodiments of the present invention.

FIG. 7 illustrates computer system 700 adapted to use embodiments of the present invention, e.g. storing and/or executing software associated with the embodiments. Central processing unit (CPU) 701 is coupled to system bus 702. The CPU 701 may be any general purpose CPU. However, embodiments of the present invention are not restricted by the architecture of CPU 701 as long as CPU 701 supports the inventive operations as described herein. Bus 702 is coupled to random access memory (RAM) 703, which may be SRAM, DRAM, or SDRAM. ROM 704 is also coupled to bus 702, which may be PROM, EPROM, or EEPROM. RAM 703 and ROM 704 hold user and system data and programs as is well known in the art.

Bus 702 is also coupled to input/output (I/O) controller card 705, communications adapter card 711, user interface card 708, and display card 709. The I/O adapter card 705 connects storage devices 706, such as one or more of a hard drive, a CD drive, a floppy disk drive, a tape drive, to computer system 700. The I/O adapter 705 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 711 is adapted to couple the computer system 700 to a network 712, which may be one or more of a telephone network, a local (LAN) and/or a wide-area (WAN) network, an Ethernet network, and/or the Internet network. User interface card 708 couples user input devices, such as keyboard 713, pointing device 707, and the like, to the computer system 700. The display card 609 is driven by CPU 701 to control the display on display device 710.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communicating between two or more endpoint communication devices, said method comprising: outputting data in a first multiport protocol from a first endpoint communication device that resides in a first protected network that is protected by a first firewall; converting said data from the first multiport protocol to data having a single port proprietary protocol that is not natively supported by at least said first endpoint communication device; and reconverting said converted data from said single port proprietary protocol to data having a second multiport protocol for receipt by a second endpoint device, which is in a second protected network.

2. The method of claim 1 wherein said converting is performed by a device within said first protected network.

3. The method of claim 1 wherein said converting is performed under the control of a device outside of said first protected network.

4. The method of claim 3 wherein said device outside of said first protected network comprises a dedicated versatile network (DVN) device.

5. The method of claim 1 wherein said converting comprises converting said data having multiport protocol to tunneling protocol for traversing a firewall and reconversion from said tunneling protocol to said single port proprietary protocol.

6. The method of claim 1 wherein said reconverting is performed by a device within said second protected network.

7. The method of claim 1 wherein said reconverting is performed under the control of a device outside of said second protected network.

8. The method of claim 1 wherein said first multiport protocol is the same as said second multiport protocol.

9. The method of claim 8 wherein at least one of said first and second multiport protocol utilizes one or more protocols selected from the group consisting of HTTP, HTTPS, FTP, TFTP, SSH, TELNET and SNMP with respect to ports of the multiport protocol.

10. The method of claim 1 wherein said first and second multiport protocol are selected from the list consisting of H.323 and SIP.

11. The method of claim 1 wherein said data having a single port proprietary protocol traverses at least one of a firewall protecting said first protected network and a firewall protecting said second protected network.

12. The method of claim 1 wherein said data having a single port proprietary protocol travels at least a portion of a network between said endpoint devices.

13. A method for communicating between two or more endpoint devices, said method comprising: outputting, from a first endpoint device within a first protected network, data in a first multiport protocol; converting said outputted data from said first multiport protocol to a tunneling protocol for traversing a firewall protecting said first protected network; and converting said data from said tunneling protocol to a single port proprietary protocol that is not natively supported by said two or more endpoint devices.

14. The method of claim 13 wherein said converting from said tunneling protocol to said single port proprietary protocol is performed by a front-end device residing external to said first protected network.

15. The method of claim 13 further comprising: receiving data communicated from a second endpoint device residing on a second protected network, said received data in said single port proprietary protocol; converting said received data from said single port proprietary protocol to said tunneling protocol for traversing said firewall protecting said first protected network; converting said received data from said tunneling protocol to said first multiport protocol; and inputting said data to said first endpoint device in said first multiport protocol.

16. The method of claim 15 wherein said converting from said single port proprietary protocol to said tunneling protocol is performed by a front-end device residing external to said first protected network.

17. The method of claim 13 further comprising: converting said data from said single port proprietary protocol to a second multiport protocol; and sending said data in said second multiport protocol to a second endpoint device residing on a second protected network.

18. The method of claim 17 wherein said converting from said single port proprietary protocol to said second multiport protocol is performed by a back-end device residing within said second protected network.

19. The method of claim 17 wherein said first and second multiport protocol are the same protocol.

20. The method of claim 13 wherein said data having a single port proprietary protocol travels at least a portion of a network between said endpoint devices.

21. A communication community system comprising: a first protected network and a second protected network, wherein said first protected network comprises a first endpoint device protected by a first firewall and said second protected network comprises a second endpoint device protected by a second firewall; a front-end device residing outside of said protected networks; and communication links between said first and second protected networks and said device outside of said protected networks, wherein said communication links comprise the use of a proprietary protocol to traverse said first firewall and said second firewall using a commonly-open port, wherein the proprietary protocol is a single-port protocol adapted for communication through said commonly-open port without reconfiguration of the first and second firewalls for said traversal.

22. The system of claim 21 wherein said first protected network comprises a back end device for converting multiport protocol data, from said first endpoint device, to single port proprietary protocol data capable of traversing said first firewall.

23. The system of claim 22 wherein said second protected network comprises a back end device for converting said single port proprietary protocol data to a multiport protocol data for receipt at said second endpoint device.

24. The system of claim 21 wherein said device outside of said protected networks comprises a dedicated versatile network (DVN) device.

25. The system of claim 24 wherein said DVN device provides software to said first endpoint device for converting said multiport protocol data to single port proprietary protocol data.

26. The system of claim 24 wherein said DVN device provides software to said second endpoint device for conversion of single port proprietary protocol data to multiport protocol data.

27. The system of claim 21 further comprising: a device within said first protected network for converting multiport protocol data from said first endpoint device to tunneling protocol data for traversing said first firewall.

28. A method for communicating between a first endpoint device in a first protected network and a second endpoint device in a second protected network, said method comprising: receiving single port proprietary protocol data at a back end device in said second protected network, wherein said single port proprietary protocol data was created, by a conversion process, from data having a first multiport protocol from said first endpoint device; and converting, at said back end device, said proprietary protocol data to data having a second multiport protocol for receipt by said second endpoint device.

29. The method of claim 28 wherein said first and second multiport protocols are selected from the list consisting of H.323 and SIP.

30. The method of claim 28 wherein said first and second multiport protocols are the same.

31. The method of claim 28 wherein at least one of said first and second multiport protocols utilizes one or more protocols selected from the group consisting of HTTP, HTTPS, FTP, TFTP, SSH, TELNET and SNMP with respect to ports of the multiport protocol.

* * * * *